US006976108B2

(12) United States Patent
Kim et al.

(10) Patent No.: US 6,976,108 B2
(45) Date of Patent: Dec. 13, 2005

(54) SYSTEM ON A CHIP HAVING A SYSTEM BUS, AN EXTERNAL BUS, AND A BUS ARBITER WITH PROGRAMMABLE PRIORITIES FOR BOTH BUSES, SOFTWARE, AND METHOD FOR ASSIGNING PROGRAMMABLE PRIORITIES

(75) Inventors: Youngsik Kim, Yongin (KR); Yun-Tae Lee, Yongin (KR)

(73) Assignee: Samsung Electronics Co., Ltd., Suwon-si (KR)

(*) Notice: Subject to any disclaimer, the term of this patent is extended or adjusted under 35 U.S.C. 154(b) by 580 days.

(21) Appl. No.: 09/773,874

(22) Filed: Jan. 31, 2001

(65) Prior Publication Data

US 2002/0138678 A1 Sep. 26, 2002

(51) Int. Cl.$^7$ .............................................. G06F 12/00
(52) U.S. Cl. ...................... 710/240; 710/309; 710/306; 710/113; 710/114; 710/115; 710/116; 710/117; 710/118
(58) Field of Search ................................ 710/241, 243, 710/244, 309, 306, 113–118

(56) References Cited

U.S. PATENT DOCUMENTS

| 5,239,651 | A | * | 8/1993 | Sodos ........................ 710/241 |
| 5,475,850 | A | | 12/1995 | Kahn ......................... 395/290 |
| 5,500,945 | A | | 3/1996 | Maeda et al. ........... 395/185.09 |
| 5,506,970 | A | | 4/1996 | Wozniak ..................... 395/293 |
| 5,517,650 | A | * | 5/1996 | Bland et al. ................. 713/323 |
| 5,524,215 | A | | 6/1996 | Gay ............................ 395/287 |
| 5,526,495 | A | | 6/1996 | Shibata et al. .............. 395/307 |
| 5,526,496 | A | | 6/1996 | Alnuweiri ................... 395/305 |

(Continued)

FOREIGN PATENT DOCUMENTS

| DE | 4307139 A1 | * | 9/1994 | ........... G06F/13/36 |
| EP | 479702 A2 | * | 4/1992 | ........... G06F/13/28 |
| EP | 0654743 A1 | | 5/1995 | |
| EP | 0654743 A1 | | 5/1995 | |
| EP | 0658852 A2 | | 6/1995 | |
| EP | 0658852 A2 | | 6/1995 | |
| EP | 0658852 A3 | | 3/1998 | |
| WO | WO 99/28893 | | 10/1999 | |

OTHER PUBLICATIONS

"DMA", Webopedia.com, Nov. 11, 2003.*
Garcia, M.J., et al., "Single Chip PCI Bridge and Memory Controller for PowerPC Microprocessors," Oct. 10–12, 1994, IEEE, Computer Design: VLSI in Computers and Processors, ICCD Proceedings, p. 409–412.*
Yang, Q., et al., "Desgin and Analysis of Multiple-Bus Arbiters with Different Priority Schemes," Mar. 7–9, 1990, IEEE, Databases, Parallel Archictectures and Their Applications, International Conference, p. 238–247.*

Primary Examiner—Mark H. Rinehart
Assistant Examiner—Donna K. Mason
(74) Attorney, Agent, or Firm—Marger Johnson & McCollom, P.C.

(57) ABSTRACT

A system on a chip has functional blocks accommodated by at least one system bus, and an external bus for accommodating communication with external blocks. A single multi-jurisdictional bus arbiter has programmable rankings for assigning priorities to requests from blocks that are masters for either one of the both buses. Software and methods are also provided for assigning the priorities. The requests are analyzed with respect to which of the buses they require, and then priorities are assigned to maximize bus utilization, with increased speed for a system on a chip. In addition, a multi-jurisdictional multi-channel direct memory access block can be a master block for the system bus or the external bus.

38 Claims, 22 Drawing Sheets

U.S. PATENT DOCUMENTS

| | | | |
|---|---|---|---|
| 5,553,268 A | 9/1996 | Willenz et al. | 395/485 |
| 5,555,383 A | 9/1996 | Elazar et al. | 395/306 |
| 5,559,968 A | 9/1996 | Stancil et al. | 395/306 |
| 5,583,999 A | 12/1996 | Sato et al. | 395/280 |
| 5,590,290 A | 12/1996 | Kondo et al. | 395/298 |
| 5,596,749 A | 1/1997 | Cantrell et al. | 395/673 |
| 5,604,874 A | 2/1997 | Kondo et al. | 395/298 |
| 5,619,661 A * | 4/1997 | Crews et al. | 710/119 |
| 5,619,726 A * | 4/1997 | Seconi et al. | 710/22 |
| 5,619,727 A | 4/1997 | Chen et al. | 395/842 |
| 5,625,779 A * | 4/1997 | Solomon et al. | 710/113 |
| 5,632,020 A | 5/1997 | Gephardt et al. | 395/283 |
| 5,640,518 A | 6/1997 | Muhich et al. | 395/290 |
| 5,652,895 A | 7/1997 | Poisner | 395/750 |
| 5,657,458 A | 8/1997 | Kondo et al. | 395/298 |
| 5,664,142 A | 9/1997 | Boldt et al. | |
| 5,689,657 A | 11/1997 | Desor et al. | 395/299 |
| 5,708,783 A | 1/1998 | Yazdy | 395/293 |
| 5,717,154 A | 2/1998 | Gulick | 84/604 |
| 5,727,171 A | 3/1998 | Iachetta, Jr. | 395/287 |
| 5,734,845 A | 3/1998 | Sugahara | 395/293 |
| 5,734,846 A * | 3/1998 | Robertson | 710/113 |
| 5,761,452 A | 6/1998 | Hooks et al. | 395/296 |
| 5,774,679 A | 6/1998 | Kondo et al. | 395/285 |
| 5,778,200 A | 7/1998 | Gulick | 395/293 |
| 5,790,568 A | 8/1998 | Luong et al. | 371/37.1 |
| 5,790,811 A | 8/1998 | Hewitt | 395/285 |
| 5,794,070 A | 8/1998 | Rabe et al. | 395/842 |
| 5,796,968 A | 8/1998 | Takamiya | 395/293 |
| 5,802,330 A | 9/1998 | Dutton | 395/296 |
| 5,805,840 A | 9/1998 | Dutton | 395/296 |
| 5,815,676 A | 9/1998 | Yazdy | 395/293 |
| 5,822,549 A * | 10/1998 | LaBerge | 710/107 |
| 5,825,878 A | 10/1998 | Takahashi et al. | |
| 5,828,856 A * | 10/1998 | Bowes et al. | 710/308 |
| 5,845,097 A | 12/1998 | Kang et al. | 395/297 |
| 5,845,131 A | 12/1998 | Kim | 395/733 |
| 5,850,529 A | 12/1998 | Nakamura | 395/288 |
| 5,857,081 A | 1/1999 | Furuta | 395/308 |
| 5,862,355 A | 1/1999 | Logsdon | 395/296 |
| 5,867,670 A | 2/1999 | Kim et al. | 395/293 |
| 5,870,570 A | 2/1999 | Chambers et al. | |
| 5,875,309 A | 2/1999 | Itkowsky et al. | 395/293 |
| 5,878,279 A | 3/1999 | Athenes | |
| 5,884,051 A * | 3/1999 | Schaffer et al. | 710/107 |
| 5,894,586 A * | 4/1999 | Marks et al. | 710/28 |
| 5,901,295 A | 5/1999 | Yazdy | 395/293 |
| 5,925,118 A | 7/1999 | Revilla et al. | 710/110 |
| 5,933,613 A | 8/1999 | Tanaka et al. | |
| 5,933,616 A | 8/1999 | Pecone et al. | 395/309 |
| 5,951,667 A * | 9/1999 | Abramson | 710/309 |
| 5,956,493 A | 9/1999 | Hewitt et al. | 395/293 |
| 5,968,154 A | 10/1999 | Cho | 710/119 |
| 5,970,234 A | 10/1999 | Jin | 395/291 |
| 5,978,879 A | 11/1999 | Harumoto et al. | 710/129 |
| 5,983,302 A | 11/1999 | Christiansen et al. | 710/113 |
| 6,003,116 A * | 12/1999 | Morita et al. | 711/141 |
| 6,021,455 A | 2/2000 | Kondo et al. | 710/241 |
| 6,026,464 A | 2/2000 | Cohen | 711/5 |
| 6,046,952 A * | 4/2000 | Novak et al. | 365/222 |
| 6,047,345 A | 4/2000 | Kondo et al. | 710/110 |
| 6,070,205 A | 5/2000 | Kato et al. | 710/100 |
| 6,070,212 A | 5/2000 | Yasuda et al. | 710/107 |
| 6,081,863 A * | 6/2000 | Kelley et al. | 710/312 |
| 6,098,133 A | 8/2000 | Summers et al. | 710/107 |
| 6,108,738 A | 8/2000 | Chambers et al. | |
| 6,163,826 A * | 12/2000 | Khan et al. | 710/107 |
| 6,195,723 B1 * | 2/2001 | Neal et al. | 710/313 |
| 6,260,093 B1 * | 7/2001 | Gehman et al. | 710/309 |
| 6,438,635 B1 * | 8/2002 | Date et al. | 710/113 |
| 6,601,126 B1 * | 7/2003 | Zaidi et al. | 710/305 |
| 6,738,845 B1 * | 5/2004 | Hadwiger et al. | 710/240 |
| 2001/0032301 A1 * | 10/2001 | Morita et al. | 711/162 |
| 2002/0038401 A1 * | 3/2002 | Zaidi et al. | 710/305 |

* cited by examiner

| | | EXTERNAL BUS MASTER | | SYSTEM BUS MASTER | |
|---|---|---|---|---|---|
| | NO REQUEST REQ[1:0]=2'b00 | EXTERNAL BUS ONLY REQ[1:0]=2'b10 | SYSTEM BUS ONLY REQ[1:0]=2'b01 | BOTH BUSES REQ[1:0]=2'b11 | |
| DRAM REFRESH CONTROLLER | O | O | X | X | |
| CPU | O | X | O | O | |
| DDMA BLOCK | O | X | O | O | |
| GDMA CHANNEL | O | O | X | O | |
| EXTERNAL DEVICE | O | O | X | X | |

FIG. 11

| CLASSIFICATION OF SET | ELEMENT |
|---|---|
| SET OF FUNCTIONAL BLOCKS MAKING A SYSTEM BUS REQUEST (SYSTEM BUS MASTER S) | CPU, DDMA BLOCK, AND GDMA BLOCK |
| SET OF FUNCTIONAL BLOCKS MAKING AN EXTERNAL BUS REQUEST (E) | DRAM REFRESH CONTROLLER, CPU, DDMA BLOCK, GDMA CHANNEL, AND EXTERNAL DEVICE |
| SET OF FUNCTIONAL BLOCKS MAKING ONLY A SYSTEM BUS REQUEST (SO) | CPU |
| SET OF FUNCTIONAL BLOCKS MAKING ONLY AN EXTERNAL BUS REQUEST (EO) | DRAM REFRESH CONTROLLER, GDMA CHANNEL, AND EXTERNAL DEVICE |
| SET OF FUNCTIONAL BLOCKS MAKING A REQUEST FOR BOTH SYSTEM BUS AND EXTERNAL BUS (ES) | CPU, DDMA BLOCK, AND GDMA CHANNEL |
| SET OF FUNCTIONAL BLOCKS MAKING REQUESTS FOR A SYSTEM BUS OR AN EXTERNAL BUS (A) | DRAM REFRESH CONTROLLER, CPU, DDMA BLOCK, GDMA CHANNEL, AND EXTERNAL DEVICE |

FIG. 17

| ITEM | PROBABILITY THAT ELEMENT HAVING BUS OWNERSHIP PERFORMS OPERATION | | | BUS UTILIZATION |
|---|---|---|---|---|
| | ELEMENT OF SET EO | ELEMENT OF SET ES | ELEMENT OF SET SO | |
| EXCLUSIVE BUS ARBITRATION | $\dfrac{1}{n(A)}$ | $\dfrac{1}{n(A)}$ | $\dfrac{1}{n(A)}$ | $\dfrac{n(EO)+2n(EO)+n(SO)}{2n(A)}$ |
| HIERACHICAL BUS ARBITRATION | $\dfrac{n(ES)+2n(SO)}{2n(S)n(EO)}$ | $\dfrac{1}{2n(S)}$ | $\dfrac{1}{n(A)}$ | $\dfrac{4n(SO)+3n(ES)}{4n(S)}$ |
| PRESENT INVENTION | $\dfrac{n(EO)+n(SO)}{n(A)n(EO)}$ | $\dfrac{1}{n(A)}$ | $\dfrac{n(EO)+n(SO)}{n(A)n(SO)}$ | 1 |

SYSTEM ON A CHIP HAVING A SYSTEM BUS, AN EXTERNAL BUS, AND A BUS ARBITER WITH PROGRAMMABLE PRIORITIES FOR BOTH BUSES, SOFTWARE, AND METHOD FOR ASSIGNING PROGRAMMABLE PRIORITIES

BACKGROUND OF THE INVENTION

1. Field of the Invention

The present invention is related to the field of systems integrated on a semiconductor chip, and more specifically to systems having a system bus, an external bus, and a bus arbiter with programmable priorities for both buses, software, and methods for assigning such priorities.

2. Description of the Related Art

Information computing systems, such as computer type systems, are increasingly provided on a single semiconductor chip. When they are so provided, the are called System On a Chip (SOC).

In SOC systems, various functional blocks (that are also called blocks or "IP" blocks from "Intellectual Property") are integrated on the chip. They exchange data by a device called a bus, which is connected to all of them as a system.

Referring now to FIG. 1, an example of a typical bus system 100 is shown. Bus system 100 includes a bus 110, bus masters 120, bus slaves 160, and a bus arbiter 190. It will be observed that the functional blocks of system 100 are classified either as bus masters 120 or bus slaves 160.

Bus masters 120 need to use bus 110 to read data from or write data to one of the bus slaves 160. For such an operation, bus masters 120 need exclusive ownership of bus 110. (Bus slaves 160 cannot be granted bus ownership—they simply prepare and transmit data in response to a read or write request of a bus master 120.)

Only one master 120 can use the bus at a time. Conflicting needs between different masters 120 are resolved by bus arbiter 190. The resolution takes place as follows.

Each bus master 120 first issues a request signal REQ to bus arbiter 190, which contains a request to use bus 110 (also called ownership request). Bus arbiter 190 receives all the requests, and resolves in what order masters 120 will be granted ownership of bus 110. Then bus arbiter transmits bus grant signals GNT to the various masters 120, which contain bus grants.

Arbiter 190 resolves the order by assigning priorities to each of masters 120. Each time the bus ownership is granted to the bus master 120 having the highest priority, among those bus masters 120 issuing bus requests.

Various schemes are used for assigning priorities to bus masters, by making some decisions in advance. One such scheme is a fixed priority scheme, where the masters 120 are ranked in a fixed way. Another such scheme is a round-robin scheme, where the masters 120 receive rotating priorities depending on which one waited the longest—and once their request becomes the highest and is granted, they drop again to the bottom.

A problem specific to the SOC design is that, in addition to a system bus for the on-chip blocks, an external bus may also be used, in addition to a system bus that deals with the on-chip master blocks. An external bus is defined as a bus for accessing a read only memory (ROM), a static random access memory (SRAM), a flash memory, a dynamic RAM (DRAM), an external input/output (I/O) device and the like, which are positioned outside the chip.

This means that, for SOC design, there can be at least two buses (system bus and external bus), with respective ownerships that need to be arbitrated. This is a difficult problem, because the external devices are not part of the chip, and thus not fully known in advance.

Two main arbitration schemes have been developed for SOC designs, the exclusive arbitration scheme and the hierarchical scheme. These are described immediately below.

Referring now to FIG. 2A, a prior art system-on-a-chip 200 is shown that uses an exclusive arbitration scheme. It will be appreciated that advantages of this type of system are that the arbiter circuit is simple, and that the operational priorities of the functional blocks can be programmed.

System 200 is provided on a chip 205, which can be a semiconductor chip. System 200 includes a system bus 210 on chip 205, and an external bus 215. Each bus has its master and slave operational blocks.

Masters for the system bus 210 are the following functional blocks: a Central Processing Unit (CPU) 222, Dedicated Direct Memory Access (DDMA) blocks 224, 226, and a multi-channel General Direct Memory Access (GDMA) block 228. GDMA 228 can have four channels (e.g. numbered 0, 1, 2, and 3), that can only operate through the system bus 210 one at a time. DDMA blocks 224, 226 communicate with other IP blocks 234, 236 respectively.

Slaves for the system bus 210 are the following functional blocks: an internal memory controller 262, and an external memory controller 244. Internal memory controller 262 controls internal memory 272.

Masters for the external bus 215 are the external memory controller 244, and a Dynamic Random Access Memory (DRAM) Refresh Controller 264, that operates through controller 244. In other words, external bus 215 is subordinated to system bus 210.

Masters for the external bus 215 can also be blocks outside chip 205, which is a peculiar and different feature of the external bus. Such blocks are provided on other devices, and are also called off-chip devices. One such block can be an external device 273. External device 273 operates as an external bus master to drive the external bus 215 when it is not used by the functional blocks within the SOC chip 205, thereby effectuating a direct access to a memory 282 or external I/O devices 274 outside chip 205.

Additionally, slaves for the external bus 215 can also be off-chip blocks. In the example of FIG. 2A, slaves for bus 215 are the following functional blocks: a Read Only Memory (ROM) 282, a DRAM 284, and an external Input/Output (I/O) block 274.

System 200 includes a bus arbiter 292, which implements an exclusive arbitration scheme or method. According to the exclusive conventional bus arbitration method, each master operates as a system bus master, and only one functional block operates at any one time. The external bus is considered a slave, and external memory controller 244 serves as a hierarchical bus bridge. In this case, a selected functional block has ownership of both the system bus and the external bus. This means that the system bus and the external bus cannot be owned by different functional blocks at the same time.

In its best implementation, the exclusive arbitration scheme implemented by arbiter 292 uses a hybrid arbitration method that is described below.

Referring now to FIG. 2B, the hybrid arbitration method is described in more detail. It will be appreciated that the hybrid arbitration method is a combination of a fixed ranking scheme and a round robin arbitration scheme.

According to the hybrid arbitration method, requests 222-1, 224-1, 226-1, 228-1, 228-2, 228-3, 228-4, 264-1 are first bundled in groups according to the master blocks that originate them. Each group contains requests of equivalent importance. Request 264-1 from DRAM 264 is placed in Group A by itself. Requests 224-1, 226-1, 228-1, 228-2, 228-3, 228-4 are bundled in Group B. And request 222-1 from CPU 222 is placed in Group C by itself.

Then the groups are ranked according to their importance. Group A (request to refresh DRAM) is ranked as the most important, and Group B and Group C are bundled in a composite Group D as being equivalent.

In the example of FIG. 2B, priorities are assigned as follows. The members of Group A (i.e. requests 264-1 from DRAM 264) have a fixed priority over the members of Group D. Within Group D, there is a round robin scheme between Group B and Group C. In other words, priority alternates between the member of Group B that has the highest priority, and the member of Group C that has the highest priority (which is always a request 222-1 from the CPU 222). And within Group B, there is a round robin scheme of the members, as shown.

It should be remembered that the scheme of 2B is implemented from the point of view of arbiter 292, which is an arbiter that decides priorities between master blocks of only system bus 210.

Referring now to FIG. 2C, an example is described of the performance of system 200 of FIG. 2A. FIG. 2A shows snapshots of bus request signals REQ in association with operation of the functional blocks, and changes in the priority order of the functional blocks through eight steps of operations, labeled Step 1, Step 2, . . . , Step 8. Each step denotes a one-time operation of each functional block subjected to arbitration by bus arbiter 292. Even though steps are shown as similar, the absolute time required for executing each step may vary, depending on its nature.

For the steps of FIG. 2C, some operating assumptions have been made. These assumptions have been made only for future ease of comparison, as will be appreciated from the below.

These assumptions are first that the hybrid scheme of FIG. 2B is used. Second, that the DRAM refresh controller does not make an operation request in steps 5, 6, and 7, and that the CPU 222 makes an operation request in the step 1, while the remaining functional blocks make continuous operation requests.

As can be seen from FIG. 2C, one functional block is selected at any one time, regardless of requests for a system bus and an external bus. The selected functional block will have ownership of both the system bus and external bus. The shadowed functional block denotes one that is granted ownership to perform actual operation. However, in steps 4, 5, 6, and 7, although the selected functional block uses either only the system bus or only the external bus during its actual operation, the functional block has ownership of both buses, which degrades bus utilization.

Referring now to FIG. 3A, a prior art system-on-a-chip 300 is shown that uses a hierarchical arbitration scheme. It will be appreciated that this scheme achieves higher bus utilization over the exclusive scheme described above. This comes at a cost of having twice the number of arbiters, and that the operational priorities of all functional blocks can not be programmed as well as in the above.

System 300 is provided on a chip 305, which can be a semiconductor chip. Many components of system 300, such as the system bus 210 and functional blocks 222, 224, 234, 226, 236, 228, 244, 262, 272, and 264 are provided on chip 305, and can be identical to similarly numbered blocks in system 200, and therefore a more detailed description will not be repeated.

In addition, system-on-a-chip 300 is for connection to off-chip functional blocks 273, 274, 282, 284, similar to what was described with reference to FIG. 2A. Connection to such blocks is through an external bus 315.

Furthermore, system-on-a-chip 300 includes two arbiters 394, 396. As will be seen, progress in the prior art was made by including the second arbiter.

System bus arbiter 394 is for arbitrating requests regarding the system bus 210, and external bus arbiter 396 is for arbitrating requests regarding the external bus 315. The two arbiters 394, 396 perform what is known as hierarchical arbitration relative to each other. System bus arbiter 394 is classified as being in a higher hierarchy than external bus arbiter 396. In other words, the operation of system bus arbiter 394 is independent, while the operation of external bus arbiter 396 is a subordinate of system bus 394. (And external memory controller 244 serves as a hierarchical bus bridge.) This is illustrated below.

Referring now to FIG. 3B and FIG. 3C, these operations are illustrated. It should be noted that each one of arbiters 394, 396 requires its own separate diagram for addressing requests only of its own bus. In addition (not depicted) is the fact that requests for arbiter 396 are subordinated to requests for arbiter 394.

This achieves higher bus utilization than the exclusive arbitration scheme described above. The better utilization is illustrated by the below.

Referring now to FIG. 3D, an example is described of the performance of system 300 of FIG. 3A. It will be appreciated that FIG. 3D is analogous to FIG. 2C. In addition, the same operating assumptions have been made in FIG. 3D as for the evolution of priorities of FIG. 2C.

FIG. 3D shows snapshots of bus request signals REQ in association with operation of the functional blocks for the system bus arbiter 394 and the external bus arbiter 396. As the snapshots progress, changes are seen in the priority order of the functional blocks through eight steps of operations, labeled Step 1, Step 2, . . . , Step 8. Each step denotes a one-time operation of each functional block subjected to arbitration by bus arbiters 394, 396, There are advantages in the hierarchical scheme. As seen in steps 6 and 7, different functional blocks having ownership of both buses can complete their operation, thereby offering higher bus utilization compared to the conventional exclusive bus arbitration scheme.

It will now be explained why the priority order of the functional blocks cannot be programmed as one wishes. As an example, in step 1 when the system bus arbiter 394 selects the CPU, the external bus arbiter 396 may intend to select GDMA channel #2. Arbiter 396 however is forced to select the CPU instead of the GDMA channel #2, since the functional block selected by the system bus arbiter 394 has a hierarchical priority over that selected by the external bus arbiter 396.

In other instances, operations are inefficient. For example, in step 2, although the system bus arbiter 394 selects DDMA block #0, the external bus arbiter 396 attempts to select the GDMA channel #2. In this case the GDMA channel #2 actually takes control of the external bus 315, since the functional block selected by the external bus arbiter 396 has a priority over that selected by the system bus arbiter 394. In this case, since the DDMA block #0 has ownership of the system bus 210, while the GDMA channel #2 has ownership of the external bus 315, the DDMA block #0 simply cannot complete its operation in the step 2. As also shown in steps 4 and 8, there are functional blocks that do not complete their operation properly during their allocated step, due to the absence of ownership of the external bus 315. When they do not, they have to wait for another step, while the external bus 315 is being used by another functional block that has ownership of the external bus 315 granted by the external bus arbiter 396.

In both of the schemes of FIG. 2A and FIG. 3A, it will be observed that there are inefficiencies. In some instances, one of the buses is occasionally idle. Such degrades the speed for the overall system on a chip.

BRIEF SUMMARY OF THE INVENTION

The present invention overcomes these problems and limitations of the prior art.

Generally, the present invention provides a system on a chip that has functional blocks accommodated by at least one system bus, and an external bus for communicating with external blocks. The invention also provides a chip multi-jurisdictional bus arbiter with programmable rankings for assigning priorities to requests from blocks that are masters for either one of both buses. The invention also provides software and methods for assigning the programmable priorities. The priorities are assigned considering requests from the point of view of which bus they require.

Even with a full request schedule, both buses can be used simultaneously, either for a single data transfer through both, or separate data transfers for each. This may achieve full utilization of the buses, with increased speed for a system on a chip.

The invention offers an additional advantage that priorities can be programmed without subordination even for off-chip blocks, while full utilization can be attained for both buses at the same time. In addition, the circuit for the arbiter is simpler, and only one need be used.

Moreover, the invention provides a multi-jurisdictional multi-channel direct memory access block that can be a master block for the system bus or the external bus. This accelerates transfer of data, and overall speed of a system on a chip.

The invention will become more readily apparent from the following Detailed Description, which proceeds with reference to the drawings, in which:

BRIEF DESCRIPTION OF THE DRAWINGS

FIG. 11 illustrates a Table used for classifying the requests of FIG. 9 according to the sets of FIG. 10.

FIG. 17 illustrates a Table for comparing performance of a scheme of the invention compared to those in the prior art.

DETAILED DESCRIPTION OF THE PREFERRED EMBODIMENT(S)

As has been mentioned, the present invention provides a system on a chip. Various embodiments of the invention are now described with reference to FIG. 4, FIG. 5, FIG. 6. It will be appreciated that aspects of these embodiments may be rather similar to each other, sharing many similar blocks that are similarly numbered.

Figure 4:
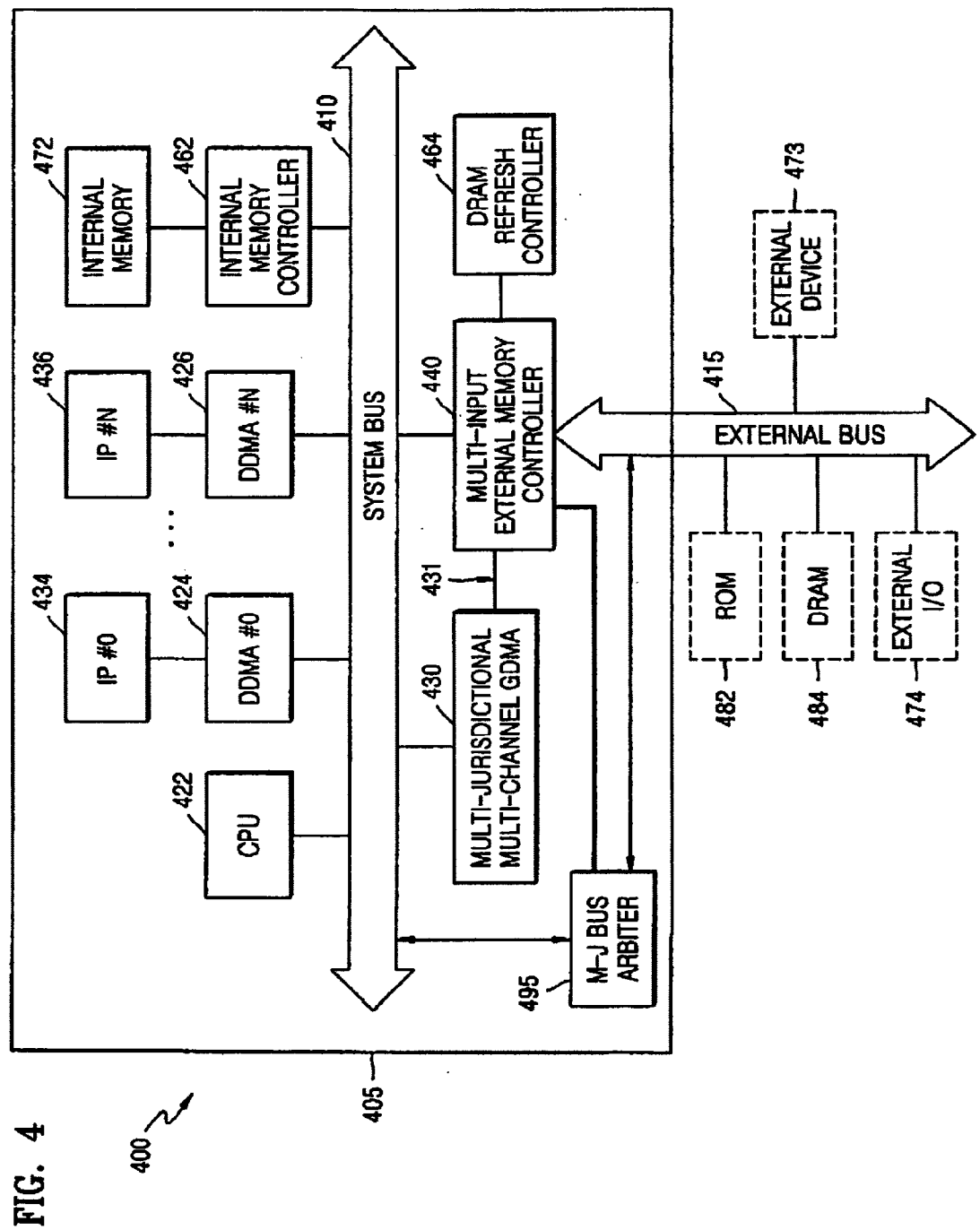
FIG. 4 is a block diagram of a system-on-a-chip (SOC) according to an embodiment of the invention that has integrated functional blocks and uses a chip multi-jurisdictional bus arbiter to accommodate an external bus and a system bus between the blocks.

Referring now particularly to FIG. 4 a system 400 is provided on a chip 405, according to an embodiment of the invention. System 400 includes a system bus 410, that can be an advanced microcontroller bus architecture (AMBA) bus developed, for example, by Advanced RISC Machines (ARM) Co. System bus 410 can be made by a advanced high performance bus (AHB).

System-on-a-chip 400 includes a CPU 422, that is a master of system bus 410. CPU 422 may be an ARM reduced instruction set computer (RISC) CPU with a cache. Exemplary blocks for CPU 422 may be parts designated by ARM Co. as ARM920T and ARM940T.

System-on-a-chip 400 also includes DDMA blocks 424, 426, directly connected to respective IP blocks 434, 436. Each of IP blocks 434, 436 may be an Ethernet medium access control (MAC), or a peripheral component interconnect (PCI) bridge. System 400 moreover includes an internal memory controller 462 for accessing an internal memory 472.

Another block of system 400 is a special GDMA block 430, that is also called a multi-jurisdictional multi-channel General DMA (mJnCGDMA) block 430 according to the invention, which is also known as simply GDMA 430. It can be for n-channels, as indicated by the overall design.

Moreover, a special multi-input external memory controller 440 is provided according to an embodiment of the invention for the SOC 400.

System 400 additionally includes an external bus 415, which is for accessing off-chip blocks. External bus 415 is coupled with the multi-input external memory controller 440.

In other words, multi-input external memory controller 440 is a block that is coupled to both the system bus 410 and to external bus 415. For purposes of this document, that renders block 440 a "dual" block.

Another aspect of controller 440 is that it receives inputs from the above-described block 430 directly, through a so-called third path 431, as will be described in more detail below. Third path 431 is distinct from the system bus 410 and the external bus 415.

System 400 further includes a DRAM Refresh Controller 464, which is coupled with the multi-input external memory controller 440.

Off-chip blocks for use with system 400 can be an external device 473, an external Input/Output device 474, a ROM 482, a DRAM 484, a static RAM (SRAM) (not shown), a flash memory (not shown), etc. External device 473 uses external bus 415 when it is not used by the functional blocks within the SOC 400. (For the functional blocks within the SOC 400 to use external bus 415, a control by the multi-input external memory controller 440 is necessarily required.) System 400 importantly includes a special multi-jurisdictional arbiter 495 for managing requests affecting both the system bus 410 and the external bus 415. Software, methods and schemes for arbiter 495 are presented below in more detail. At this point it is sufficient to note that the present invention's mJmCGDMA block 430 can be a master for both the system bus 410 and the external bus 415. This is accomplished with the cooperation of the present invention's multi-input external memory controller 440, which receives inputs also from mJmCGDMA 430 to that effect.

Figure 5:
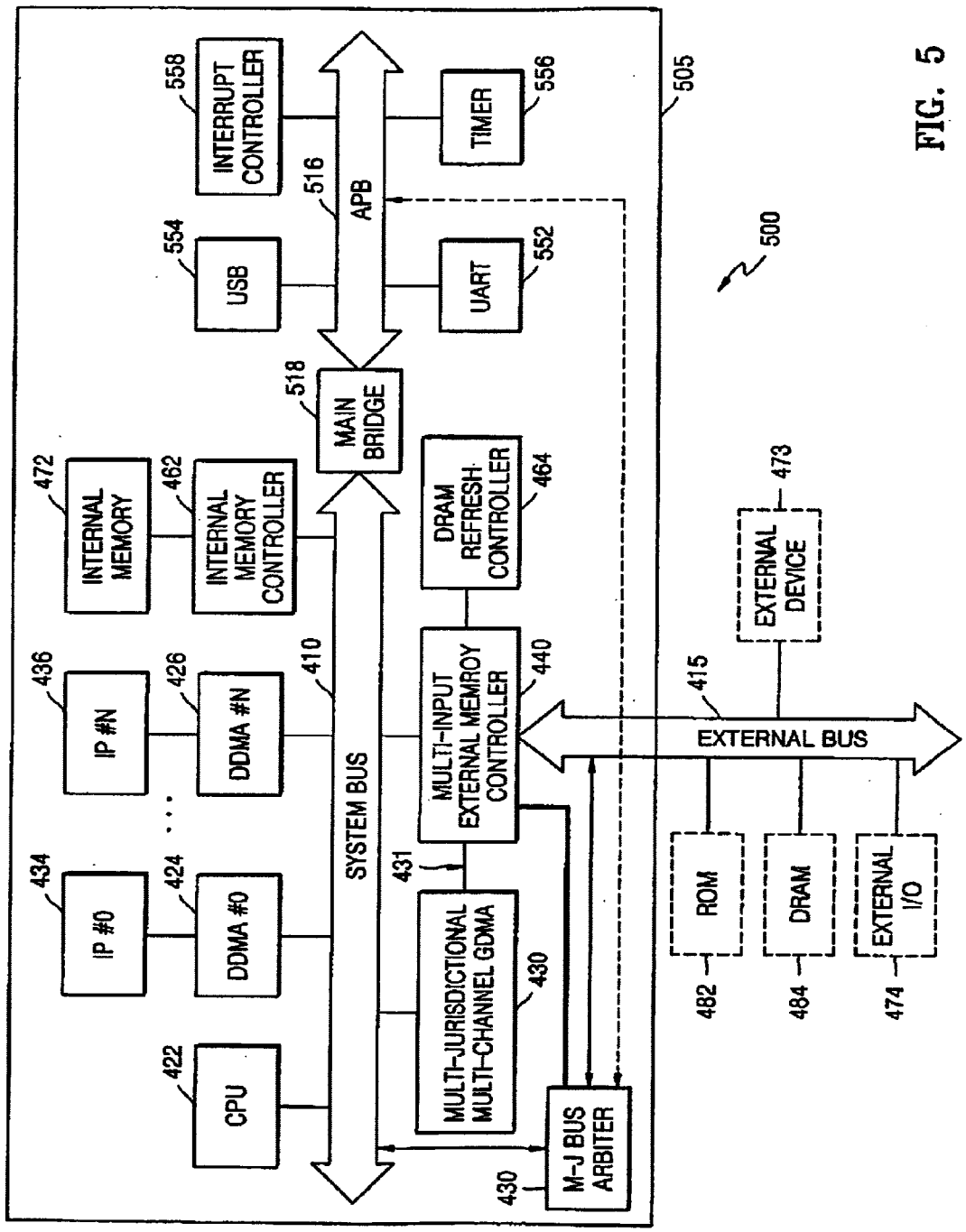
FIG. 5 is a block diagram of a system-on-a-chip (SOC) according to another embodiment of the present invention that has integrated blocks and uses a chip multi-jurisdictional bus arbiter to accommodate an external bus and two system buses between the blocks.

Referring now particularly to FIG. 5 a system 500 is provided on a chip 505, according to another embodiment of the invention. The discussion is the same as with FIG. 4 for system bus 410, external bus 415, CPU 422, DDMA#0 424, DDMA#N 426, IP#0 434, IP#N 436, mJmCGDMA 430, multi-input external memory controller 440, internal memory controller 462 and internal memory 472, all of which are provided on chip 505. In addition, system 500 is adapted for working, through external bus 415, with off-chip blocks such as external device 473, External I/O 474, ROM 482, DRAM 484, etc., similarly as discussed above in connection with FIG. 4.

In the embodiment of FIG. 5, more components are provided on chip 505 than on chip 405 of FIG. 4. An additional, auxiliary system bus APB 516, such as an advanced peripheral bus, is connected to main system bus 410 through a main bridge block 518, such as an APB Bridge. Auxiliary system bus APB 516 is for accessing additional functional blocks, configured as its slaves. Main bridge 518 may be configured as a slave to main system bus 410, for accessing additional functional blocks coupled with auxiliary system bus APB 516.

Additional functional blocks accessible through auxiliary system bus APB 516 may include a universal asynchronous receiver-transmitter (UART) 552, a universal serial bus (USB) 554, a timer 556, and an interrupt controller 558.

System 500 moreover includes a multi-jurisdictional arbiter 595 for managing requests affecting both the system bus 410 and the external bus 415. Arbiter 595 is optionally adapted to manage requests also from blocks connected through auxiliary system bus APB 516.

Figure 6:
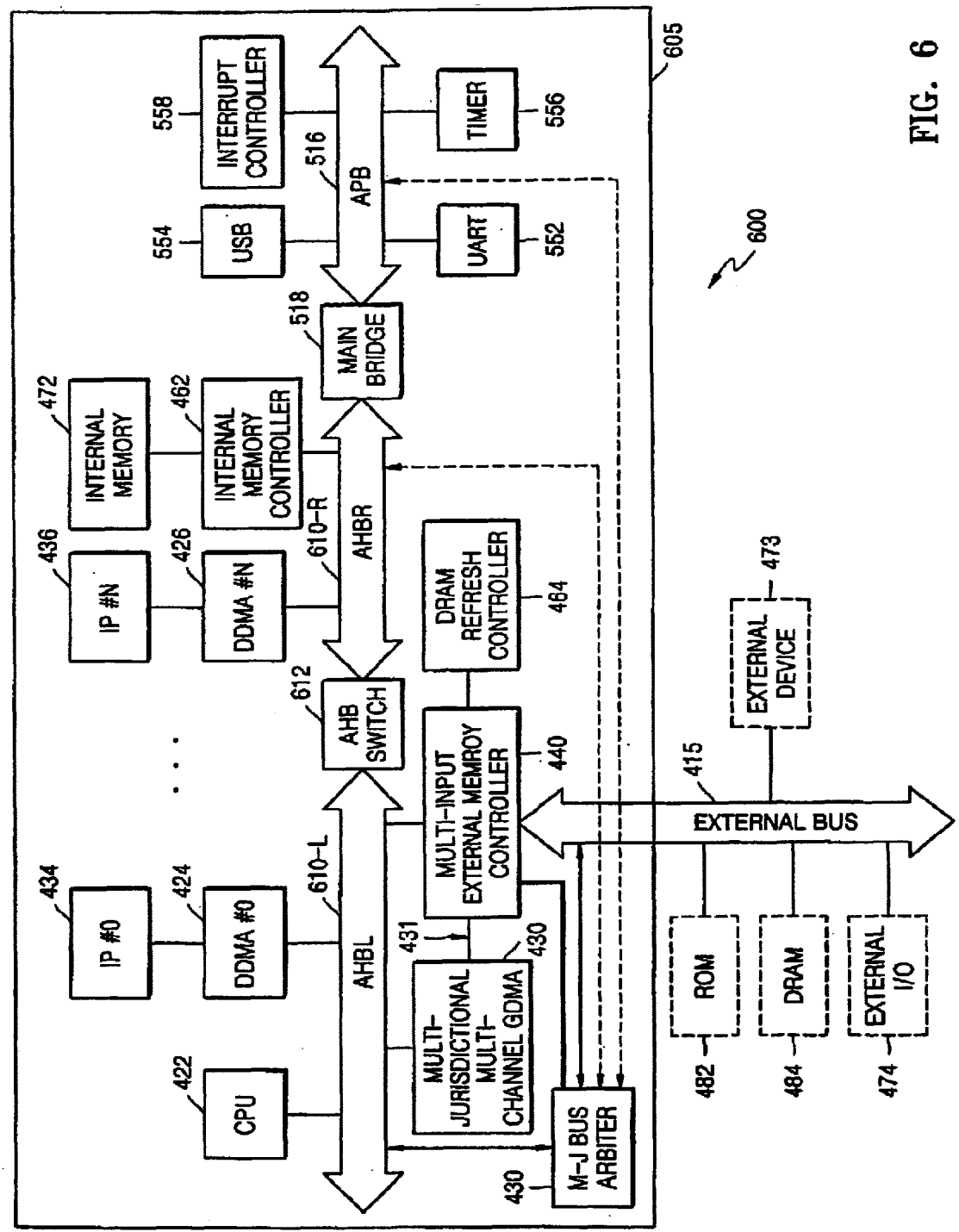
FIG. 6 is a block diagram of system on a chip (SOC) according to yet another embodiment of the invention that has integrated blocks and uses a chip multi-jurisdictional bus arbiter to accommodate an external bus and three system buses between the blocks.

Referring now particularly to FIG. 6 a system 600 is provided on a chip 605, according to yet another embodiment of the invention. The discussion is the same as with FIG. 5 for external bus 415, CPU 422, DDMA#0 424, DDMA#N 426, IP#0 434, IP#N 436, mJmCGDMA 430, multi-input external memory controller 440, internal memory controller 462 and internal memory 472, auxiliary system bus APB 516, main bridge block 518, UART 552, USB 554, timer 556, and interrupt controller 558, all of which are provided on chip 605. In addition, system 600 is adapted for working, through external bus 415, with off-chip blocks such as external device 473, External I/O 474, ROM 482, DRAM 484, etc., similarly as discussed above.

An important difference is that a main system bus is implemented by two buses, a left system bus AHBL 610-L and a right system bus AHBR 610-R. These are divided by a bus switch 612, implemented by a suitable bridge.

System 600 moreover includes a multi-jurisdictional arbiter 695 for managing requests affecting both the left system bus 610-L and the right system bus 610-R, along with the external bus 415. This is accomplished also by arbiter 695 having a direct line to bus switch 612. Arbiter 695 is optionally adapted to also manage requests from blocks connected through auxiliary system bus APB 516.

In all three shown embodiments, the arbiter can handle, as may be desired, the master blocks of all buses on a non-hierarchical form. Alternately, it may treat some of them hierarchically with respect to others.

Figure 7:
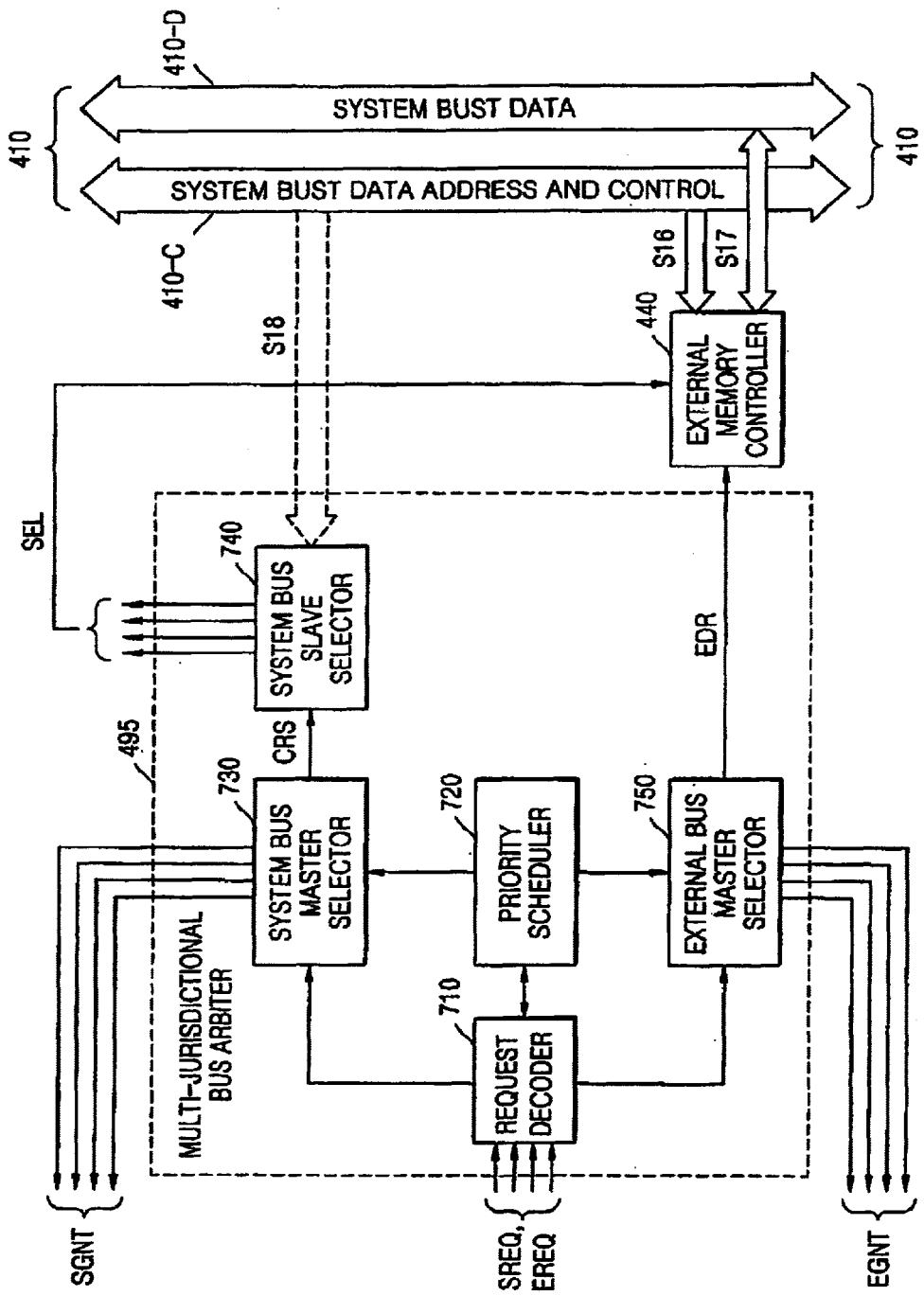
FIG. 7 is a block diagram of a multi-jurisdictional bus arbiter according to an embodiment of the present invention.

Referring now to FIG. 7, a block diagram is shown for a multi-jurisdictional bus arbiter 495 according to an embodiment of the present invention. It will be appreciated that, although the description is that for arbiter 495 of FIG. 4, the description is applicable also to arbiter 595 and 695, with minimal adjustments. It will also be observed that, given the level of detail of FIG. 7, system bus 410 is shown split into its two components of address and control 410-C and data 410-D.

Arbiter 495 includes a request decoder 710. Request decoder 710 is adapted to receive request signals REQ from the on-chip blocks that operate as masters of system bus 410, and also from the off-chip blocks that operate as masters of external bus 415. The request signals REQ are received as digital signals, and decoded by request decoder 710, which in turn produces a pertinent output. Sometimes the request signals from the masters of system bus 410 are designated as SREQ, and the request signals from the masters of external bus 415 are designated as EREQ.

Arbiter 495 also includes a priority scheduler 720. Priority scheduler 720 is adapted to receive the output of request decoder 710. Priority scheduler 720 then decides the relative priorities of the all the master block(s), as is described below. It should be remembered that priority scheduler 720 of the invention is optionally capable of being programmed with different programs, which would implement different schedules. It is advantageous, but not necessary, that the program for selecting priorities reside in priority scheduler 720.

Once the priorities have been decided, priority scheduler 720 outputs signals indicating which master block has the top priority. A key part of the invention is that a top priority can be determined to be for an off-chip block at the same time as for an on-chip block.

The output of priority scheduler may optionally be fed back into request decoder 710, if the requests are stored there. Equivalently, the requests can be stored into priority scheduler 720, and be read from it.

Arbiter 495 additionally includes a system bus master selector 730. Master selector 730 is adapted to receive an output of priority scheduler 720 (or equivalently, of request decoder 710, if the requests are stored there). Master selector 730 is further adapted to transmit a grant signal GNT to the system bus master block that has the top priority, responsive to the received output of the priority scheduler. Since this grant signal is for a master block of system bus 410, it is also designated as SGNT.

Arbiter 495 moreover includes a system bus slave selector 740. System bus slave selector 740 is adapted to receive a corresponding signal CRS from system bus master selector 730, the content of which has originated from priority scheduler 720 (or equivalently, of request decoder 710, if the requests are stored there). Equivalently, corresponding signal CRS could be received directly from priority scheduler 720. In addition, system bus slave selector 740 is optionally adapted to receive an output of the system bus 410. System bus slave selector 740 is adapted to transmit a select signal SEL to one of the system bus slaves. In some embodiments, external memory controller 440 is such a system bus slave.

Arbiter 495 further includes an external bus master selector 750. External bus master selector 750 is adapted to receive another output of priority scheduler 720 (or equivalently, of request decoder 710, if the requests are stored there). External bus master selector 750 is further adapted to transmit another grant signal GNT to the external bus master block that has the top priority, responsive to the received output of the priority scheduler. Since this grant signal is for a master block of external bus 415, it is also designated as EGNT. External bus master selector 750 is further adapted to transmit a drive signal EDR to external memory controller 440.

Figure 8:
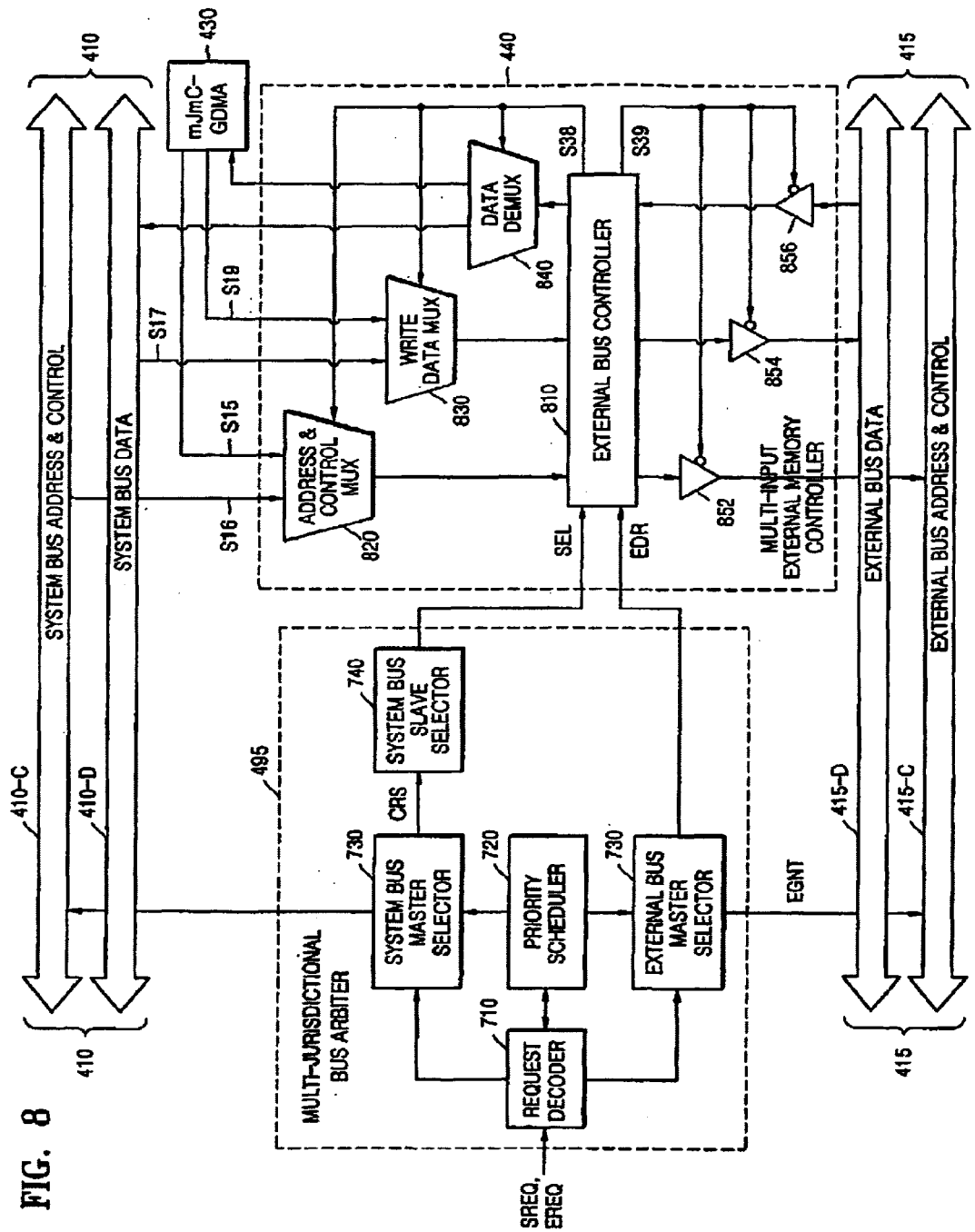
FIG. 8 is an internal block diagram of a multi-input external memory controller that may be used with the bus arbiter of FIG. 7, along with a possible layout of other components.

Referring now to FIG. 8, a multi-input external memory controller 440 is described. It will become apparent that controller 440 may be used with the bus arbiter of FIG. 7, and any of its variations suggested above. It will also be observed that, given the level of detail of FIG. 7, external bus 415 is shown split into its two components of address and control 415-C and data 415-D.

Multi-input external memory controller 440 includes an external bus controller 810. External bus controller 810 is adapted to control the external bus 415.

Optionally and preferably, external bus controller 810 is adapted to receive inputs directly from the arbiter 495. More specifically, it can receive a select signal SEL from system bus slave selector 740. Alternately, it can receive a drive signal EDR from external bus master selector 750.

External memory controller 440 also includes an address and control multiplexer 820. Address and control multiplexer 820 is adapted to receive address and control inputs from both system bus 410 and the multi-jurisdictional multi-channel general direct memory access (mJmCGDMA) block 430. Address and control multiplexer 820 is further adapted to transfer one of the received address and control inputs to external bus controller 810.

External memory controller 440 additionally includes a write data multiplexer 830. Write data multiplexer 830 is adapted to receive data inputs from both the system bus 410 and the mJmCGDMA block 430. Write data multiplexer 830 is further adapted to transfer one of the received data inputs to the external bus controller 810.

External memory controller 440 moreover includes a read data demultiplexer 840. Read data demultiplexer 840 is adapted to receive data inputs from the external bus controller 810. Read data demultiplexer 840 is further adapted to transfer the received data inputs to one of the system bus 410 and the mJmCGDMA block 430.

In the preferred embodiment, all of the address and control multiplexer 820, write data multiplexer 830, and read data demultiplexer 840 are controlled by inputs from external bus controller 810.

External memory controller 440 optionally additionally includes three tri-state buffers 852, 854, 856 coupled between external bus controller 810 and external bus 415. These may be controlled by external bus controller 810.

Referring now to FIG. 5 operations of system 500 are described. A person skilled in the art will discern how the following descriptions are adaptable also for systems 400 and 600 of FIG. 4 and FIG. 6, respectively.

First operations of CPU 422 are described. The person skilled in the art will discern that explanations for remaining ones of the components may be derived from the accompanying drawings.

When CPU 422 issues a system bus request to obtain a grant of system bus 410 ownership, CPU 422 can read data from, or write data to, registers of the blocks coupled with system bus 410. Furthermore, after having been granted ownership of system bus 410 and the auxiliary main bus 516, CPU 422 can read data from, or write data to, registers of the blocks connected through main bridge 518. For access to external DRAM 484, CPU 422 needs to obtain ownership of both system bus 410 and external bus 415. To accomplish this, CPU 422 first accesses the multi-input external memory controller 440 through the system bus 410, and then controller 440 can read and write data between the CPU and the DRAM 484 through also the external bus 415. Thus, CPU 422 operates as a system bus master. Same for CPU 422 accessing ROM 482.

DDMA blocks 424, 426 perform read and write operations on data stored in the internal memory 472 or the external memory 482. The first operation requires ownership of only system bus 410, while the latter operation requires ownership of both system bus 410 and external bus 415. Thus, DDMA blocks 424, 426 operate as system bus masters.

Multi-jurisdiction, multi-channel GDMA block 430 performs read and write operations on data stored in internal memory 472 or external memory 484. Operations of the GDMA block 430 are classified into data communication of four types:

a) between a programmed arbitrary IP block and internal memory 472,
b) between an arbitrary IP block and external memory 484,
c) between internal memory 472 and external memory 484, and
d) between the external memories 482 and 484.

The multiple channels can program each of all four types of data communication within the GDMA block 430. Even during programming of multiple channels, the GDMA. block 430 performs a control such that only one channel operates at one time. The exemplary arbitrary IP blocks to be programmed in each of the GDMA multiple channels may include UART 552, USB 554, interrupt controller 558, etc.

Of the above described types of data communication, a) requires bus ownership of only system bus 410, b) and c) require ownership of both system bus 410 and external bus 415, and d) one require bus ownership of only external bus 415. Thus, multi-jurisdiction, multi-channel GDMA 430 may operate either as an external bus master during the fourth type of operation, or as a system bus master during the remaining types of operations.

DRAM refresh controller 464, which is one of the masters of external bus 415, does not need system bus ownership. It uses only external bus 415 in order to generate periodically a signal for refreshing external DRAM 484. In order for DRAM refresh controller 464 to use external bus 415, external memory controller 440 is used to transmit a signal to the outside of the chip through external bus 415, in which case the system bus masters cannot use external memory controller 440 or external bus 415. In the same manner, for use of external bus 415 by a system bus master, a signal is transmitted to the outside of the chip by a control of external memory controller 440, while the external bus masters cannot use external bus 415 during that time.

The above type of description can be extended to any on-chip block or off chip block, depending on known and anticipated operation characteristics of each functional block. After such descriptions are complete, it is found advantageous to discuss what type of signals would be used for implementation of a device according to the invention.

The type of bus ownership requests may be represented by four two-bit bus request signals REQ[1:0]={EREQ, SREQ} using a 1-bit system bus request signal SREQ and a 1-bit external bus request signal EREQ. That is, if REQ[1:0]=2'b00, no request for a bus is made (no request), and if REQ[1:0]=2'b01, a request for system bus 410 only is made (system bus only request). If REQ[1:0]=2'b10, a request for external bus 415 only is made (external bus only request), and if REQ[1:0]=2'b01, a request for both buses is made (both bus request).

Similarly, a bus ownership grant may be represented by a bus ownership grant signal GNT[1:0]={EGNT, SGNT}. That is, if GNT[1:0]=2'b00, no bus is granted (no grant), and if GNT[1:0]=2'b01, the system bus 410 only is granted (system bus only grant). If GNT[1:0]=2'b10, external bus 415 only is granted (external bus only grant), and if GNT[1:0]=2'b11, ownership of both buses concurrently is granted (both bus grant).

An important aspect of the invention is to classify requests with reference to which bus they would use, and which they would leave idle. Classification may advantageously be implemented in the coding of the above described signals.

Figures 9, 10:
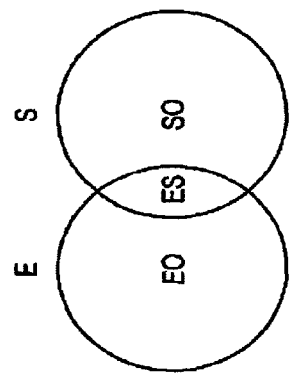
FIG. 9 illustrates a Table used for tabulating types of bus requests of functional blocks according to an embodiment of the invention.
FIG. 10 is a diagram showing a relationship between sets of requests tabulated in Table 1 of FIG. 9.

Referring now to FIG. 9, a Table 1 is shown that classifies the possible type of bus requests by each functional block. As shown in Table 1, external bus masters are DRAM refresh controller 464, a channel of mJmCGDMA block 430, and external device 473. These submit a bus request signal REQ=2'b10. System bus masters are CPU 422, DDMA blocks 424, 426, and the channel of GDMA 430 submitting a bus request signal REQ=2'b01 or REQ=2'b11.

Referring now to FIG. 10, a diagram is shown for further conceptualizing the characteristics of the requests. This type of diagram is also known as a Venn diagram. Set S is for grouping together, bundling or classifying the requests of system bus 410. Set E is for the requests of external bus 415. Their section (subset ES) is for those requests that require both buses. Subset ES leaves, in set S, a subset SO for System bus Only requests, and in set E a subset EO for External bus Only requests. The union of E and S (EO+ES+SO) is given by A, and contains All the requests. In more rigorous mathematical notation, assuming that Function n(X) is defined as the number of elements of set X, the relationship is that n(A)=n(E∪S)=n(EO)+n(ES)+n(SO) and n(ES)=n(E∩S)=n(E∩S)=n(S∩S).

Referring now to FIG. 11, it is further advantageous to show the requests of FIG. 9 in the sets indicated by FIG. 10. First, the set of functional blocks making a system bus request by a bus request signal REQ[1:0] equal to 2'b01 or 2'b11, is defined as set S which is the same as the set of system bus masters. Second, the set of functional blocks making an external bus request by a bus request signal REQ[1:0] equal to 2'b10 or 2'b11 is defined as set E. Third, the set of functional blocks making only a system bus request through a bus request signal REQ[1:0] equal to 2'b01 is defined as set SO. Fourth, the set of functional blocks making only an external bus request through a bus request signal REQ[1:0] equal to 2'b10 is defined as set EO which is the same as the set of external bus masters. Fifth, the set of functional blocks making a request for both system bus and external bus through a bus request signal REQ[1:0]equal to 2'b11 is defined as set ES. Sixth, the set of functional blocks making a request for a system bus or an external bus through a bus request signal REQ[1:0] equal to 2'b01, 2'b10, 2'b11 is defined as set A.

The above discussion facilitates description of the operation of special components of the invention.

Referring again to FIG. 7 operations of arbiter 495 are described for enabling the above types of requests. The operations are described according to the classifications of FIG. 11. The methods of arbiter 495 for assigning priorities, however, is described later.

First, if the selected functional block is the element of set ES (a bus request signal REQ is 2'b11), only system bus master selector 730 is driven. It grants a system bus grant signal SGNT 11 to the selected functional block. The system bus master selector 730 also drives the system bus slave selector 740. The system bus slave selector 740 optionally also drives external memory controller 440, so that the system bus master functional block that is being granted the bus ownership request may be granted usage of external bus 415 as well. In this case, external memory controller 440 receives system bus address and control signal S16 via address and control portion 410-C of system bus 410 from the selected master block. External memory controller 440 also receives system bus data S17 via data portion 410-D of the system bus 410 from the selected master block. The received address & control signal S16, and data S17 are for connecting to an external bus.

On the other hand, if the bus request signal is 2'b01 or 2'b10, the system bus master selector 730 and the external bus master selector 750, respectively, select different functional blocks that are granted bus grant signals.

In other words, if the selected functional block is an element of set EO (the bus request signal REQ is 2'b10), then the system bus master selector 730 may further select a functional block which is one of the elements of set SO. That is, if there are functional blocks that have made requests which belong to the set SO among the remaining functional blocks (excluding the firstly selected functional block), the functional block having the highest priority among those functional blocks is then selected. The external bus master selector 750 is driven so that an external bus grant signal EGNT is transmitted to the firstly selected functional block, while the system bus master selector 730 is driven so that a system bus grant signal SGNT is transmitted to the secondly selected functional block. The external bus master selector 750 transmits a drive signal EDR to drive the external memory controller 440, so that the selected external bus master may use the external bus 415. The system bus master selector 730 drives the system bus slave selector 740 to select a system bus slave depending on the operation of the selected system bus master. The system bus slave selector 740 determines which bus slave can be used from the system bus address and control signal S18, to transmit a selection signal to the selected bus slave.

Third, if the selected functional block is the element of set SO, request decoder 710 may further select one functional block in set EO. That is, if there are functional blocks that belong to the set EO among the remaining functional blocks (excluding the firstly selected functional block), the functional block having the highest priority among those functional blocks is then selected. System bus master selector 730 is driven so that the system bus grant signal SGNT is transmitted to the firstly selected functional block, while the external bus master selector 750 is driven so that the external bus grant signal EGNT is transmitted to the secondly selected functional block. The external bus master selector 750 drives the external memory controller 440 so that the selected external bus master may use the external bus 415.

Referring again to FIG. 8, operations of multi-input external memory controller 440 are described for enabling the above types of requests. The operations are described according to the classifications of FIG. 11.

When the external memory controller 440 operates as a system bus slave, a system bus master operates as the element of set ES such that it may use system bus 410 and external bus 415 at the same time. In this case, the system bus slave selector 740 sends a signal SEL driving external memory controller 440 to operate as a system bus slave, while the external bus master selector 750 does not drive the external memory controller. Then, the external bus controller 810 sends a control signal S38 to the address and control multiplexer 820, the write data multiplexer 830, and the read data demultiplexer 840. After that, the external bus controller 810 receives address and control signal S16 and data S17 via system bus 410 from the system bus master functional block, and decodes them to drive external bus 415 so as to access a memory or an I/O device outside the chip. For this purpose, the external bus controller 810 sends a control signal S39 to drive the tri-state buffers 852, 854 and 856 into an active state. That is, when CPU 422 or DDMA block 424 makes requests for both system bus 410 and external bus 415, the external memory controller 440 receives the address and control S16 and the data S17 from the system bus 410 and drives external bus 415.

On the other hand, when the external memory controller 440 does not operate as a system bus slave, but is driven by the external bus master selector 750 by a drive signal EDR, external memory controller 440 controls external bus 415 so that an external bus master may use external bus 415. The external bus master may be DRAM refresh controller 464, a channel of mJmCGDMA 430, or external device 473. External bus master selector 750 informs the external bus controller 810 of this by the drive signal EDR.

If the DRAM refresh controller is selected among external bus masters, external bus controller 810 cuts off signals from address and control multiplexer 820, write data multiplexer 830, and read data demultiplexer 840, and instead generates and sends a control signal for refreshing DRAM 484. If external device 473 is selected, external bus controller 810 cuts off signals from address and control multiplexer 820, write data multiplexer 830, and read data demultiplexer 840, and sends control signal S39 to tri-state buffers 852, 854, and 856 to place them in a high-impedance state, so that external device 473 can drive external bus 415. After the channel of GDMA 430 is granted external bus ownership for data communication between external memories (bus request signal REQ=2'b10), the external memory controller 440 receives address, control signal, and data S15 directly from the GDMA channel, to thereby drive external bus 415, instead of receiving address and control signal S16 and data S17 from system bus 410. To this end, the external bus controller 810 may be in direct communication with the GDMA channel through the control signal S38 from address and control multiplexer 820, write data multiplexer 830, and read data demultiplexer 840.

The signals exchanged between GDMA 430 and address and control multiplexer 820, write data multiplexer 830, and read data demultiplexer 840 are through lines of the third path 431 shown in FIG. 4.

The invention additionally provides methods, which are described below. Moreover, the invention provides apparatus that performs, or assists in performing the methods of the invention. This apparatus may be specially constructed for the required purposes, or it may comprise a general-purpose computer selectively activated or reconfigured by a computer program stored in the computer. The methods and algorithms presented herein are not necessarily inherently related to any particular computer or other apparatus. In particular, various general-purpose machines may be used with programs in accordance with the teachings herein, or it may prove more convenient to construct more specialized apparatus to perform the required method steps. The required structure for a variety of these machines will appear from this description.

Useful machines or articles for performing the operations of the present invention include general-purpose digital computers or other similar devices. In all cases, there should be borne in mind the distinction between the method of operating a computer and the method of computation itself. The present invention relates also to method steps for operating a computer and for processing electrical or other physical signals to generate other desired physical signals.

The invention additionally provides a program, and a method of operation of the program. The program is most advantageously implemented as a program for a computing machine, such as a general purpose computer, a special purpose computer, a microprocessor, etc.

The invention also provides a storage medium that has the program of the invention stored thereon. The storage medium is a computer-readable medium, such as a memory, and is read by the computing machine mentioned above.

A program is generally defined as a sequence of steps leading to a desired result. These steps, also known as instructions, are those requiring physical manipulations of physical quantities. Usually, though not necessarily, these quantities take the form of electrical or magnetic signals capable of being stored, transferred, combined, compared, and otherwise manipulated or processed. When stored, they can be stored in any computer-readable medium. It is convenient at times, principally for reasons of common usage, to refer to these signals as bits, data bits, samples, values, elements, symbols, characters, images, terms, numbers, or the like. It should be borne in mind, however, that all of these and similar terms are associated with the appropriate physical quantities, and that these terms are merely convenient labels applied to these physical quantities.

This detailed description is presented largely in terms of flowcharts, display images, algorithms, and symbolic representations of operations of data bits within a computer readable medium, such as a memory. Such descriptions and representations are the type of convenient labels used by those skilled in programming and/or the data processing arts to effectively convey the substance of their work to others skilled in the art. A person skilled in the art of programming can use this description to readily generate specific instructions for implementing a program according to the present invention. For the sake of economy, however, flowcharts used to describe methods of the invention are not repeated in this document for describing software according to the invention.

Often, for the sake of convenience only, it is preferred to implement and describe a program as various interconnected distinct software modules or features, collectively also known as software. This is not necessary, however, and there may be cases where modules are equivalently aggregated into a single program with unclear boundaries. In any event, the software modules or features of the present invention can be implemented by themselves, or in combination with others. Even though it is said that the program can be stored in a computer-readable medium, it should be clear to a person skilled in the art that it need not be a single memory, or even a single machine. Various portions, modules or features of it can reside in separate memories, or even separate machines. The separate machines may be connected directly, or through a network, such as a local access network (LAN), or a global network, such as the Internet.

In the present case, methods of the invention are implemented by machine operations. In other words, embodiments of the program of the invention are made such that they perform methods of the invention that are described in this document. These can be optionally performed in conjunction with one or more human operators performing some, but not all of them. As per the above, the users need not be collocated with each other, but each only with a machine that houses a portion of the program. Alternately, some of these machines can operate automatically, without users and/or independently from each other.

Figure 12:
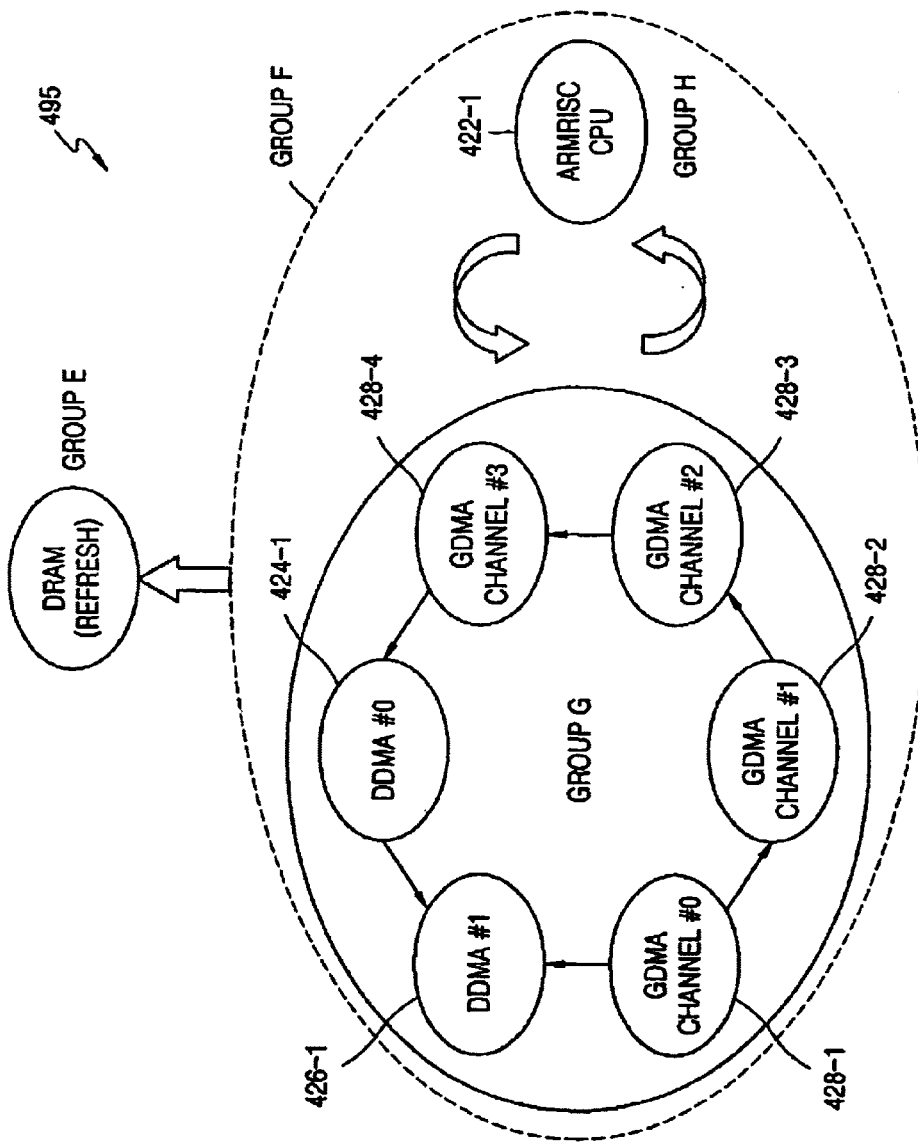
FIG. 12 is a diagram illustrating an example of rankings for a hybrid arbitration method used for assigning operation priorities to functional blocks according to an embodiment of the present invention.

Referring now to FIG. 12, a diagram is first provided for visualizing in part rankings for methods that are subsequently described according to an embodiment of the invention. It should be remembered that the rankings of FIG. 12 are only one example, and other rankings are possible according to the invention.

According to the hybrid arbitration method, requests 422-1, 424-1, 426-1, 428-1, 428-2, 428-3, 428-4, 464-1 are first bundled in groups according to the master blocks that originate them. Each group contains requests of equivalent importance. Request 464-1 from DRAM 464 is placed in Group E by itself. Requests 424-1, 426-1, 428-1, 428-2, 428-3, 428-4 are bundled in Group G, from the DDMA blocks 424, 426, and four channels of GDMA 430, respectively. And request 422-1 from CPU 422 is placed in Group H by itself.

Then the groups are ranked according to their importance. Group E (request to refresh DRAM) is ranked as the most important, and Group G and Group H are bundled in a composite Group F as being equivalent.

It should be noted that in the scheme of FIG. 12 there is only one diagram, for addressing requests of both the internal bus and the external bus for a single arbiter 495. In addition (not depicted) is the fact that requests are also classified based on which of the two buses they would use.

Methods of the invention are now described.

Figure 13:
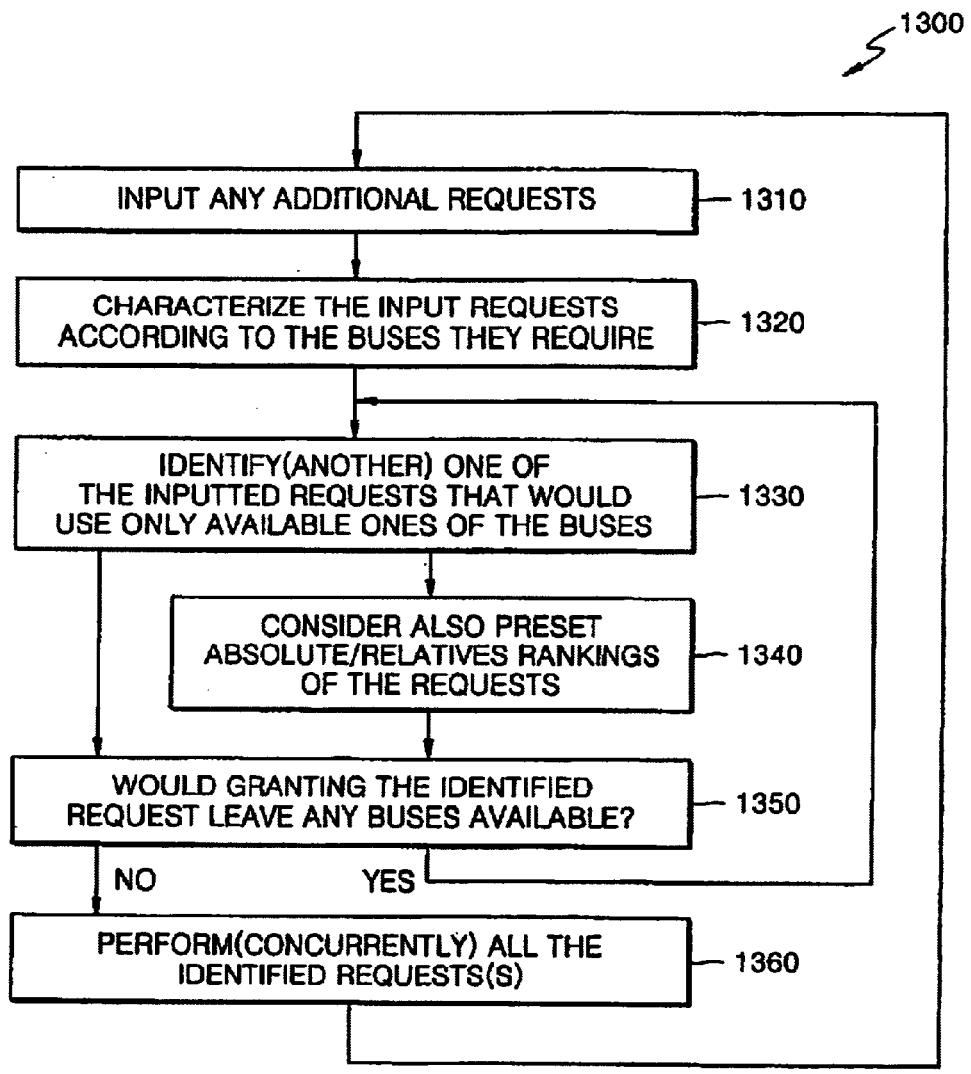
FIG. 13 is a flowchart illustrating a general method according to an embodiment of the invention.

Referring now to FIG. 13, a flowchart 1300 is used to illustrate a general method according to an embodiment of the invention.

According to a step 1310, any additional requests are input in arbiter 495. This usually happens once for every cycle of operation.

According to a next step 1320, the inputted requests are characterized according to the buses they require. In other words, whether they would require an on-chip system bus, an external bus of the chip, or both. By way of example, such a characterization was done in FIG. 11 above, at the conceptual level. The characterization can be done by special coding of the request signals, as described above.

According to a next step 1330, one of the inputted requests is identified that would use only available ones of the buses. If this step is repeated, a second (and a third) request could be identified concurrently by this step 1330.

According to an optional next step 1340, the previous step 1330 can be performed by considering also rankings of the requests. The rankings (such as those of FIG. 12) can be preset, and given in the form of absolute rankings or relative rankings. The rankings may also consider the waiting history of a request, favoring one that has waited longer among equals.

According to a next step 1350, it is inquired whether granting the above identified request would leave any of the buses available. If yes, execution reverts to step 1330, and another request is identified.

If not, then according to a next step 1360, all requests identified so far are performed concurrently. This is accomplished by granting all the identified requests, preferably concurrently. Execution then may return to step 1310.

Figure 14:
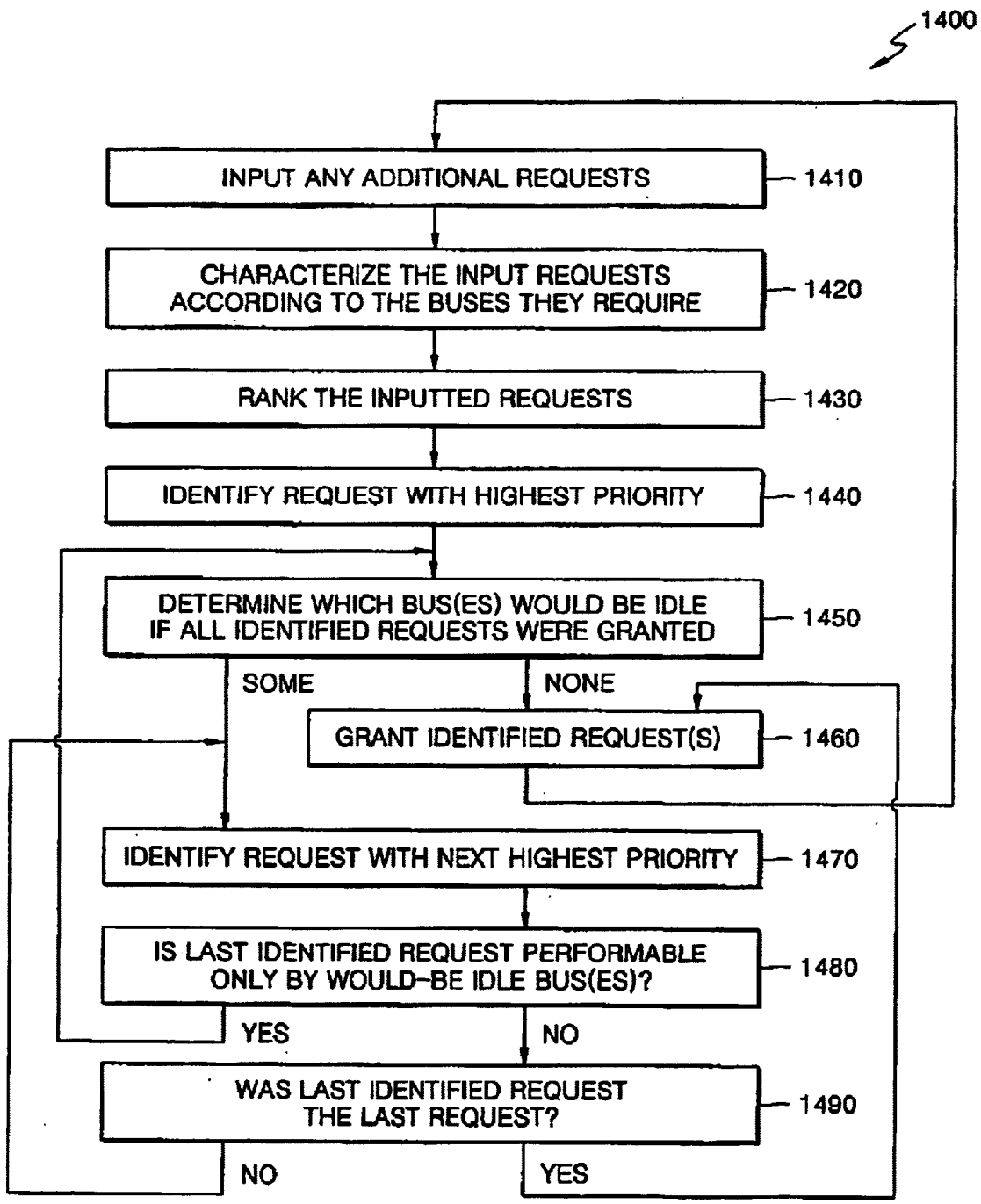
FIG. 14 is a flowchart illustrating a general method according to another embodiment of the invention.

Referring now to FIG. 14, a flowchart 1400 is used to illustrate a general method according to an embodiment of the invention.

According to a step 1410, any additional requests are input, similarly to step 1310 above.

According to a next step 1420, the inputted requests are characterized according to the buses they require, similarly to step 1320 above.

According to a next step 1430, the requests are ranked, as discussed above.

According to a next step 1440, the request with the highest priority is identified.

According to a next step 1450, it is determined which buses would be idle if all the identified requests were granted. If none, then according to a next step 1460, the identified requests are granted, and execution may revert to step 1410.

If not, then according to a next step 1470, the request with the next highest priority is identified.

According to a next step 1480, it is inquired whether the last identified request is performable (if it were granted) only by would-be idle buses. If yes, then execution continues back to step 1450.

If not, then according to a next step 1490 it is determined whether the last identified request was the last one of the inputted requests. If not, then execution continues with step 1470, to examine another request. If yes, then execution continues with step 1460.

Figure 15:
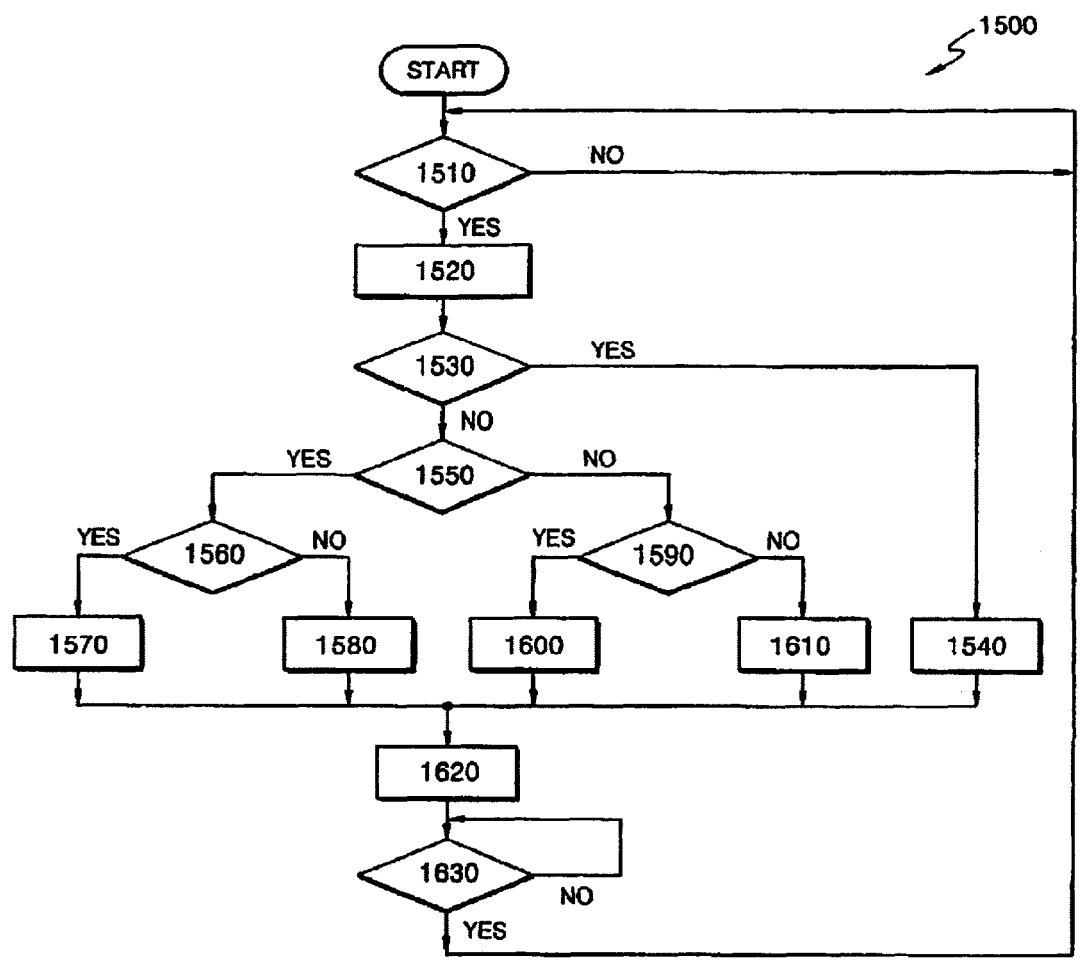
FIG. 15 is a flowchart illustrating an operation of a bus arbiter according to an embodiment of the present invention.

Referring now to FIG. 15, a flowchart 1500 is used to illustrate a particular method according to the invention. It will be appreciated that the steps of FIG. 15 show the operation of each functional block in the bus arbiter of FIG. 7 and FIG. 8.

Step 1510: The request decoder 710 checks whether a bus request signal (REQ) has been input. If there is a bus request, a process flow goes to step 1520, while if there is no bus request, the request decoder 710 waits for a bus request in the step 1510.

Step 1520: The request decoder 710 selects the functional block having the highest priority among one or those functional blocks submitting bus requests based on a preprogrammed priority algorithm, referring to the priority scheduler 720. The process flow goes to step 1530.

Step 1530: A check is made as to whether the bus request signal of the functional block selected in the step 1520 is 2'b11 corresponding to set ES. If the bus request signal is 2'b11, the process flow goes to step 1540, while if not the process flow goes to step 1550.

Step 1540: The request decoder 710 drives the system bus master selector 730 so that the functional block selected in the step 1520 may be granted system bus grant signal SGNT to use a system bus. The process flow goes to step 1620.

Step 1550: It is checked that the bus request signal of the functional block selected in the step 1520 is 2'b01 corresponding to set SO. If the bus request signal is 2'b01, the process flow goes to step 1560, while if not, the process flow goes to step 1590.

Step 1560: A check is made as to whether there are functional blocks submitting bus request signals 2'b10 corresponding to set EO among the remaining functional blocks except the functional block selected in the step 1520. If those functional blocks exist, the process flow goes to the step 1570, while if they do not exist, the process flow goes to the step 1580.

Step 1570: The request decoder 710 selects the functional block having the highest priority among the functional blocks in set EO. Then, the request decoder 710 drives the system bus master selector 730 so that a system bus grant signal SGNT is given to the functional block selected in the step 1520, while the request decoder 710 drives the external bus master selector 750 so that an external bus grant signal EGNT is given to the functional block selected in the step 1570. The process flow goes to step 1620.

Step 1580: The request decoder 710 drives only the system bus master selector 730 so that the system bus grant signal SGNT is given to the functional block selected in the step 1520. The process flow goes to the step 1620.

Step 1590: A check is made as to whether there are functional submitting bus request signals 2'b01 corresponding to set SO among the remaining functional blocks except the functional block selected in the step 1520. If those functional blocks exist, the process flow goes to step 1600, while if they do not exist, the process flow goes to step 1610.

Step 1600: The request decoder 710 selects the functional block having the highest priority among the functional blocks in set SO. Then, the request decoder 710 drives the external bus master selector 750 so that an external bus grant signal EGNT is given to the functional block selected in the step 1520, while it drives the system bus master selector 730 so that the system bus grant signal SGNT is given to the functional block selected in the step 1520. The process flow goes to the step 1620.

Step 1610: The request decoder 710 drives only the external bus master selector 750 so that the external bus grant signal EGNT is given to the functional block selected in the step 1520. The process flow goes to the step 1620.

Step 1620: If the system bus master selector 730 selects one system bus master, the system bus master selector 730 drives the system bus slave selector 740 so that an appropriate system bus slave may be selected depending on the operation of the selected system master. In particular, if the selected system bus master is the element of set ES, the system bus slave selector 740 drives the external memory controller 440, which is a system bus slave, so that the functional block selected in the step 1520 simultaneously uses the system bus and the external bus. If the external bus master selector 750 selects one external bus master, the external bus master selector 32 drives the external memory controller 440 to control the external bus. The priority scheduler 720 readjusts the priority of each functional block according to a program. The process flow then goes to step 1630.

It should be clarified that step 1620 is optional. In another embodiment of the invention, step 1620 is not included, and the process flow goes directly to step 1630.

Step 1630: A check is made as to whether the operation of the selected functional blocks has been completed. If the operation is complete, the process flow returns to the step 1510, while if not, the process flow continues to wait for the completion in the step 1630.

Figure 16:
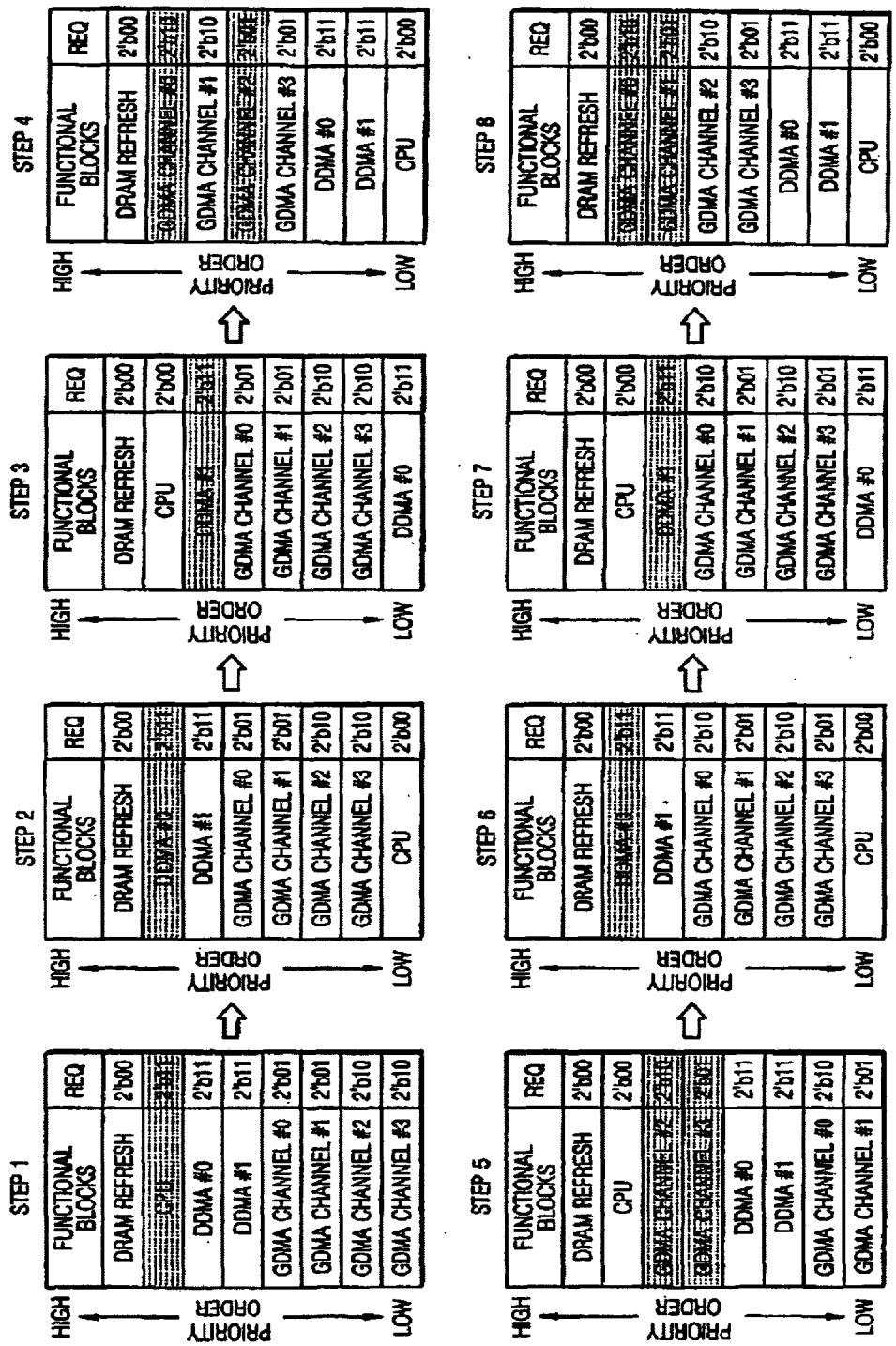
FIG. 16 shows snapshots resulting from bus arbitration according to a bus arbitration scheme according to an embodiment of the present invention.

Referring now to FIG. 16, snapshots are shown resulting from bus arbitration according to a bus arbitration scheme according to an embodiment of the present invention. It will be appreciated that relevant signals are shown next to requests, for characterizing the requests in terms of which buses they would use.

One of the important aspects of the invention is that requests are treated non-hierarchically for use by masters of the chip's system bus and external bus, whether the latter are on the chip or off the chip. That is, blocks of set A are addressed, not just S. Another aspect to note is that in some instances, disparate requests are performed simultaneously. Moreover, the priority of all functional blocks, on chip and off-chip can be programmed using a single arbiter 495.

FIG. 17 illustrates a Table 3 for comparing performance of a scheme of the invention compared to those in the prior art. Table 3 works in terms of probabilities.

For Table 3, the following assumptions have been made. First, that the rate at which each functional block performs its operation is made equal if the functional blocks having the same priority performs their operations for a sufficient period of time. Second, that the sets of functional blocks, i.e., sets EO, ES, and SO, all have one or more elements. In Table 3, the probability of performing an operation is determined per set.

Figure 1:
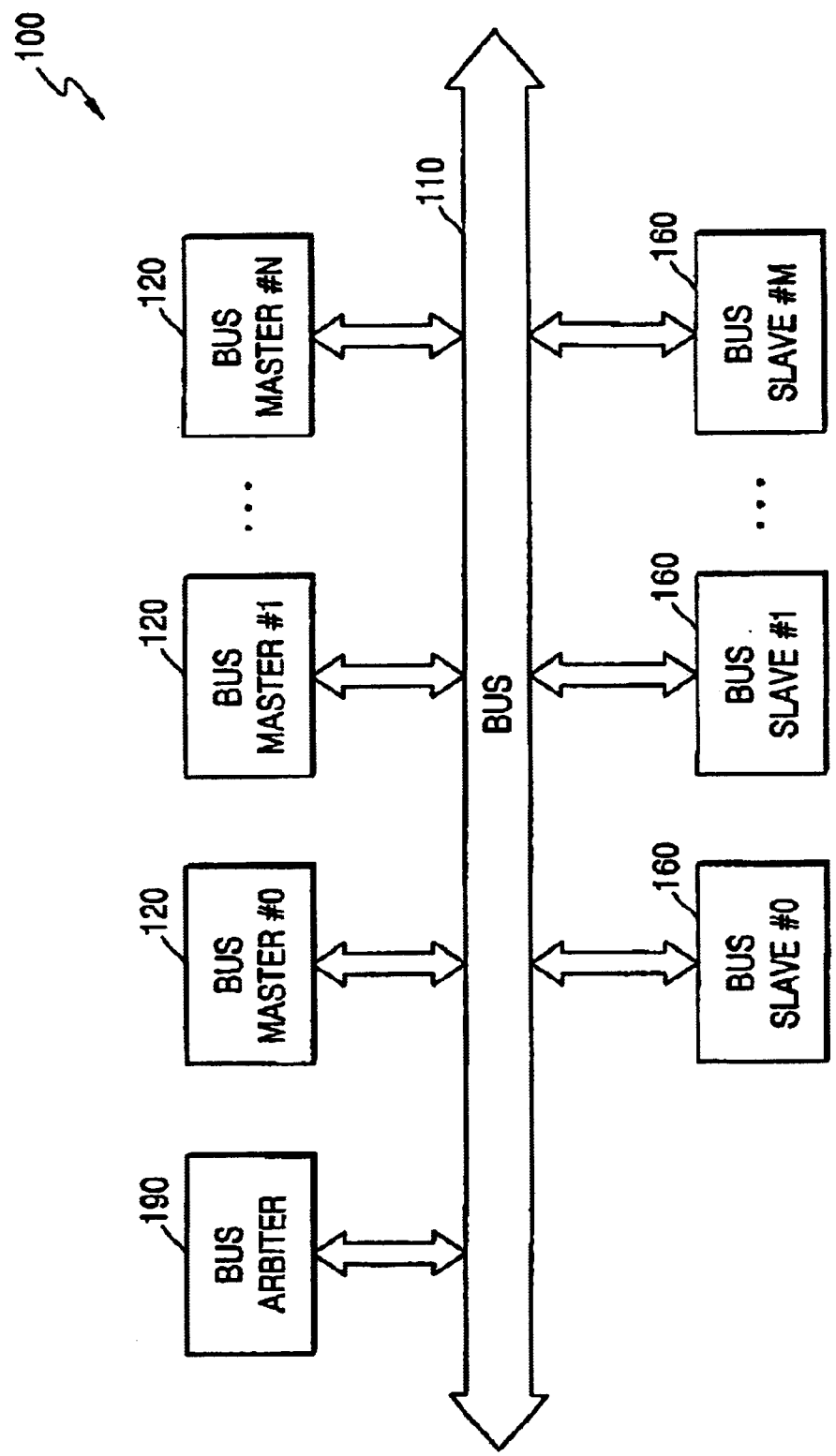
FIG. 1 is a block diagram of a bus system of a memory in the prior art.
Figure 2A:
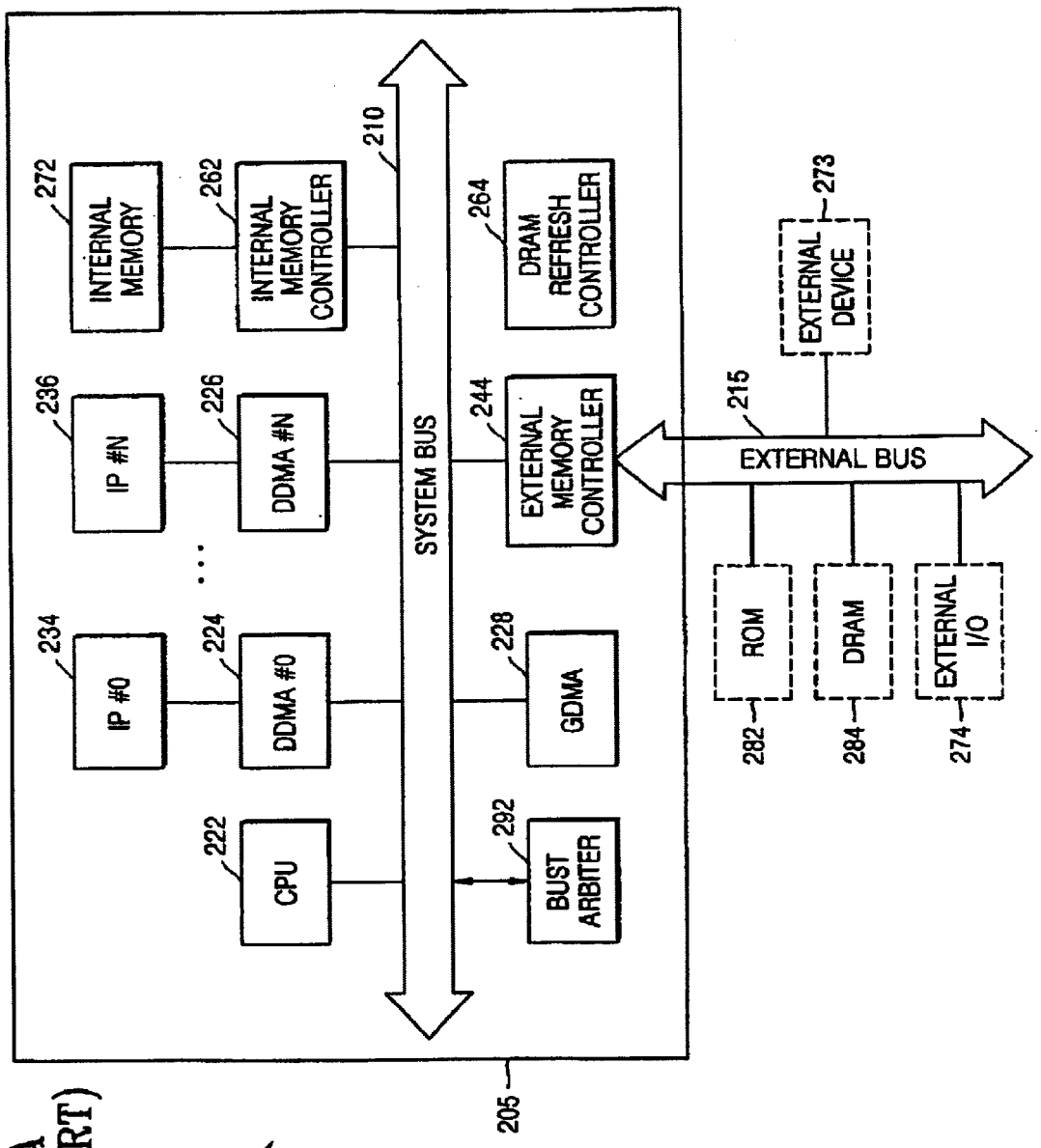
FIG. 2A is a block diagram of a system-on-a-chip (SOC), using a single arbiter in an exclusive type design in the prior art.
Figure 2B:
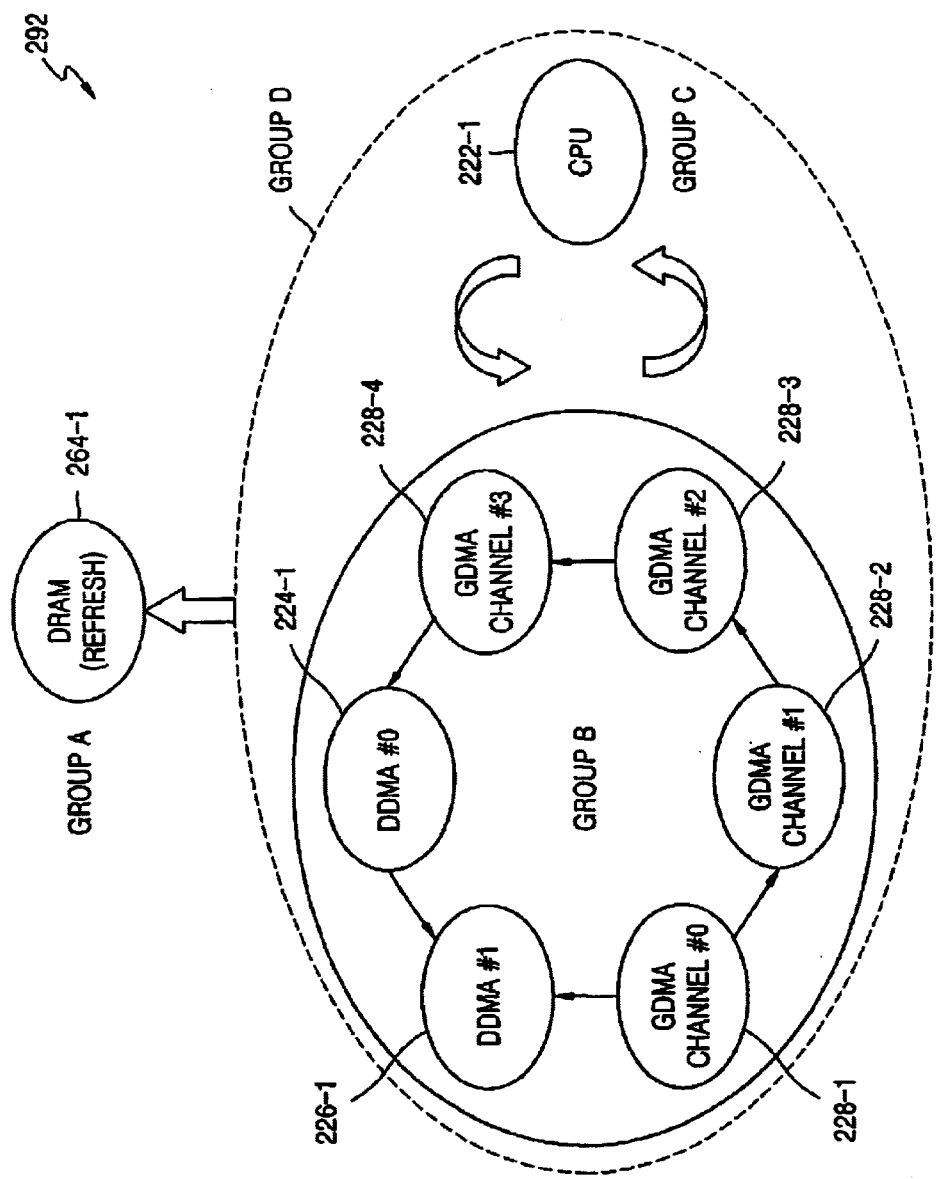
FIG. 2B is a diagram illustrating an example of rankings for a hybrid arbitration method in the prior art used for assigning operation priorities to functional blocks by a single arbiter in FIG. 2A that uses an exclusive scheme.
Figure 2C:
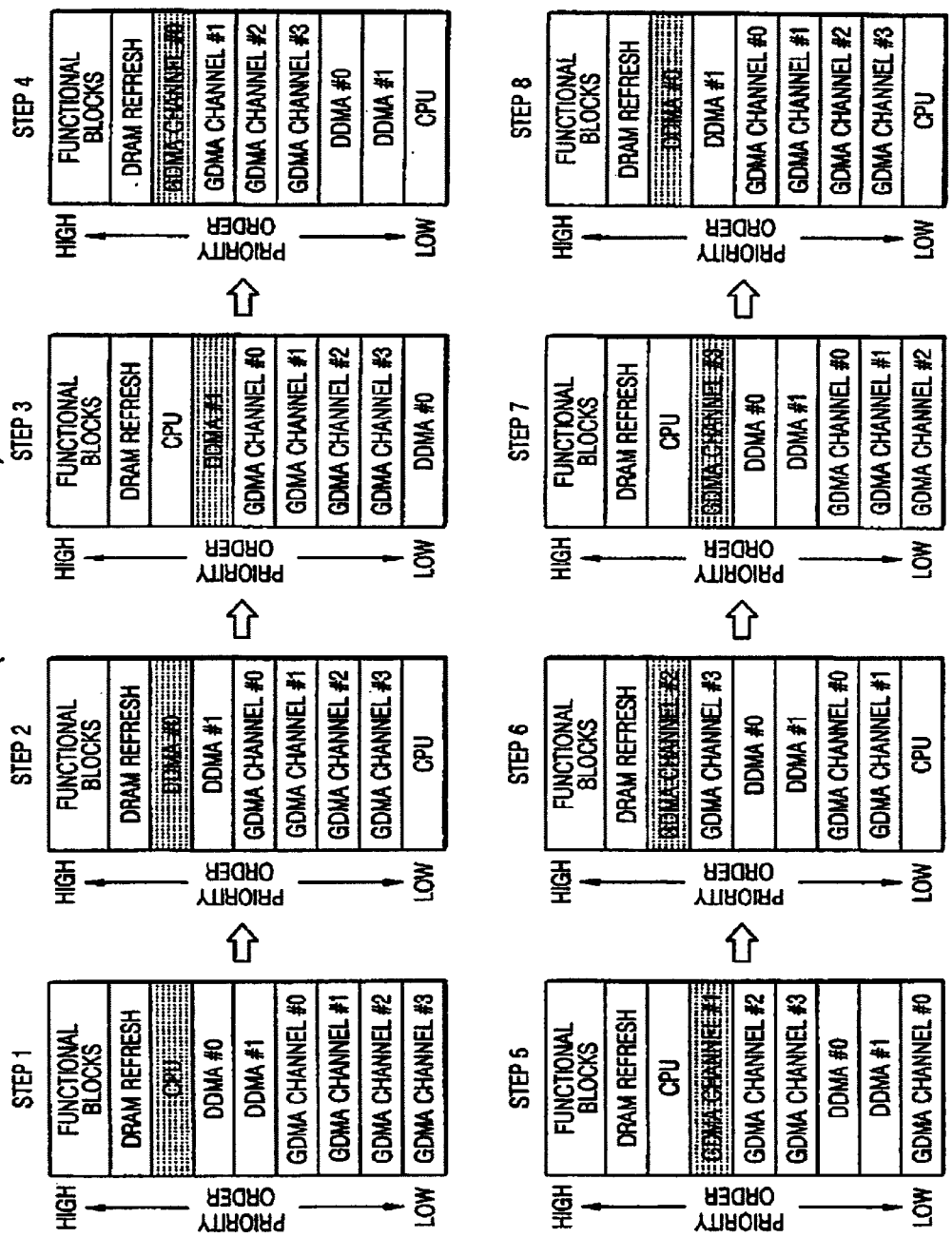
FIG. 2C shows snapshots resulting in the system of FIG. 2A from bus arbitration according to the exclusive bus arbitration scheme, which uses the hybrid scheme of FIG. 2B.
Figure 3A:
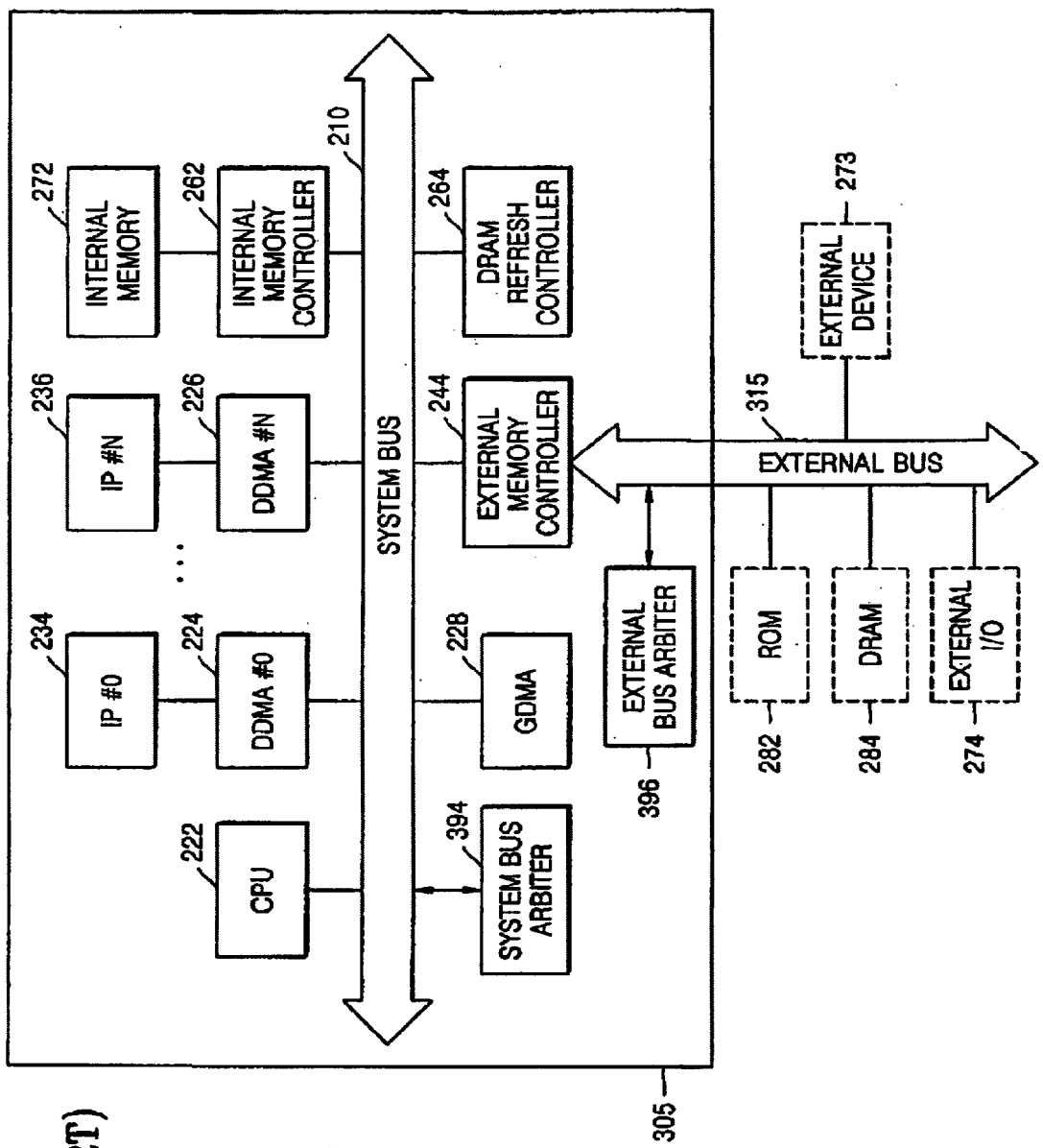
FIG. 3A is a block diagram of a system-on-a-chip (SOC), using a single arbiter in a hierarchical type design in the prior art.
Figure 3B:
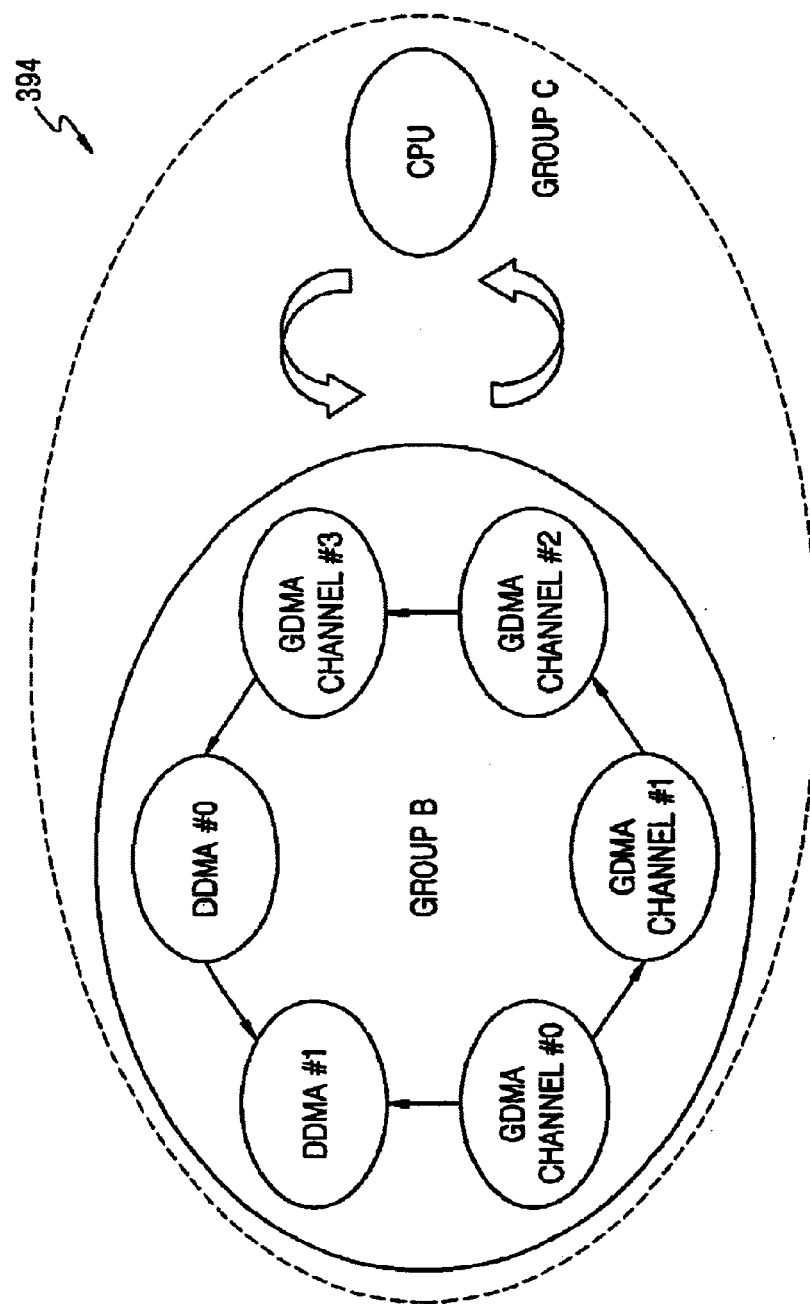
FIG. 3B is a diagram illustrating an example of rankings in the prior art used for assigning operation priorities to functional blocks by one of the two arbiters in FIG. 3A.
Figure 3C:
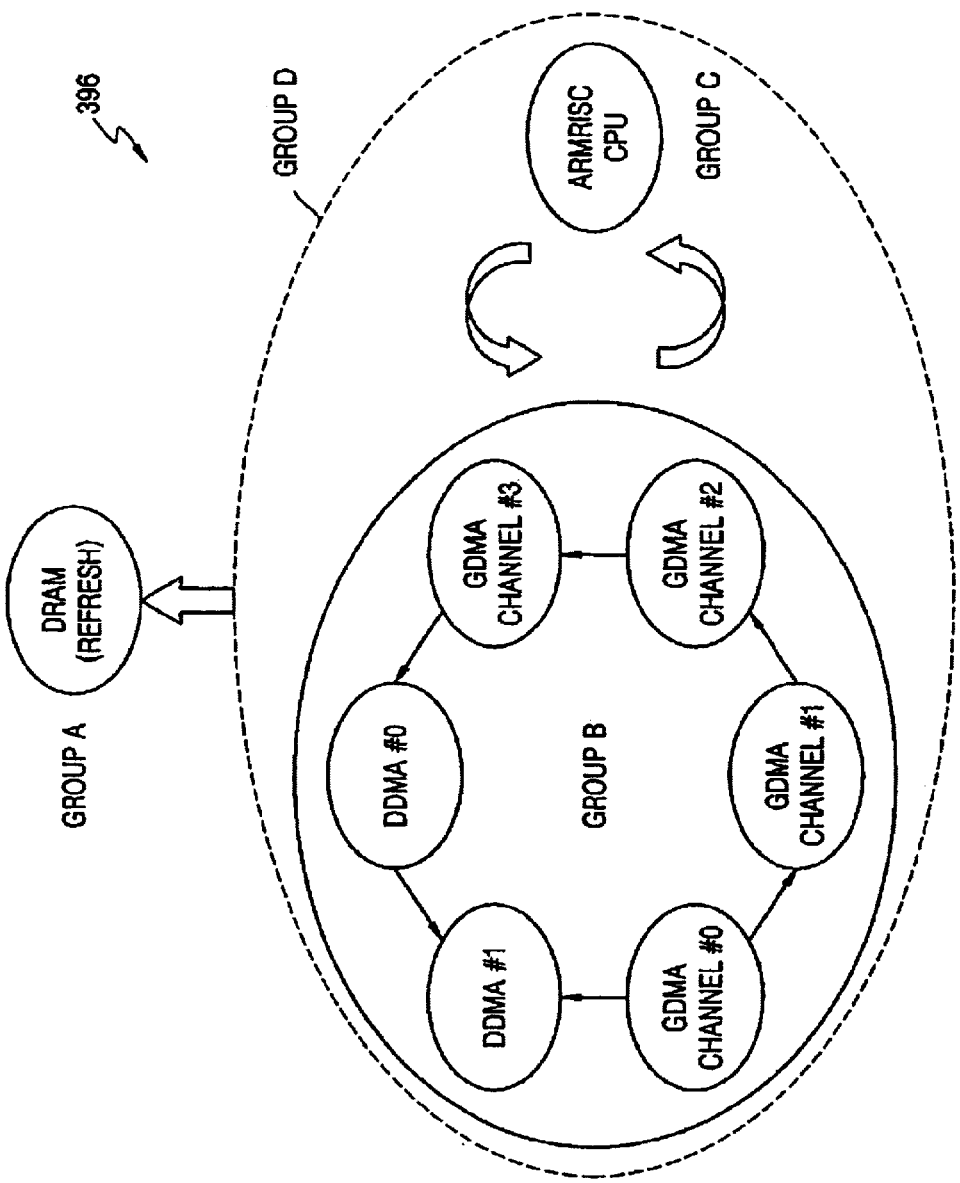
FIG. 3C is a diagram illustrating an example of rankings in the prior art used for assigning operation priorities to functional blocks by the other one of the two arbiters in FIG. 3A, which is in a hierarchical scheme with the rankings of FIG. 3B.
Figures 1, 3D:
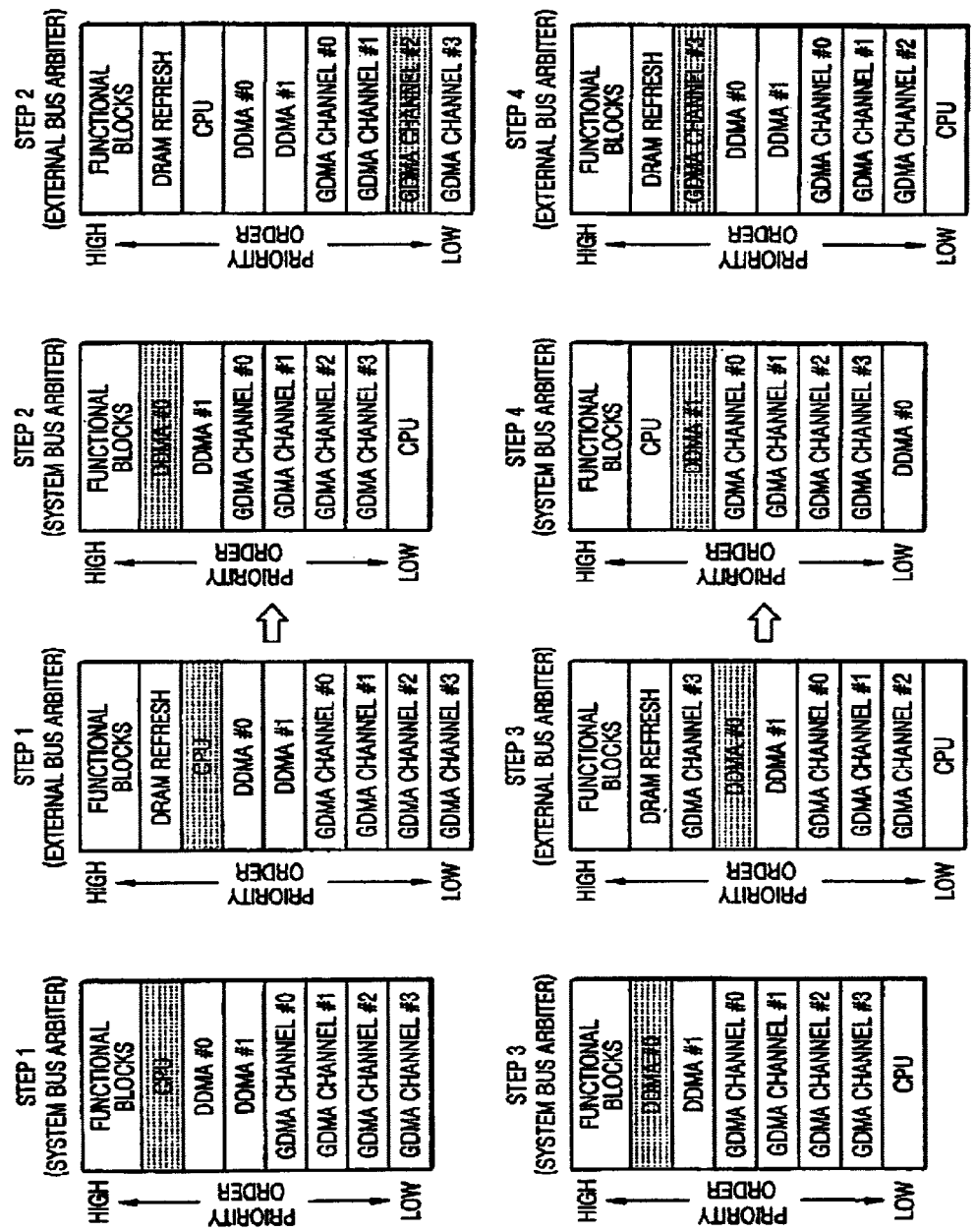
FIG. 3D shows snapshots resulting in the system of FIG. 3A from bus arbitration according to a conventional hierarchical combination of the schemes of FIG. 3B and FIG. 3C.
Figures 2, 3D:
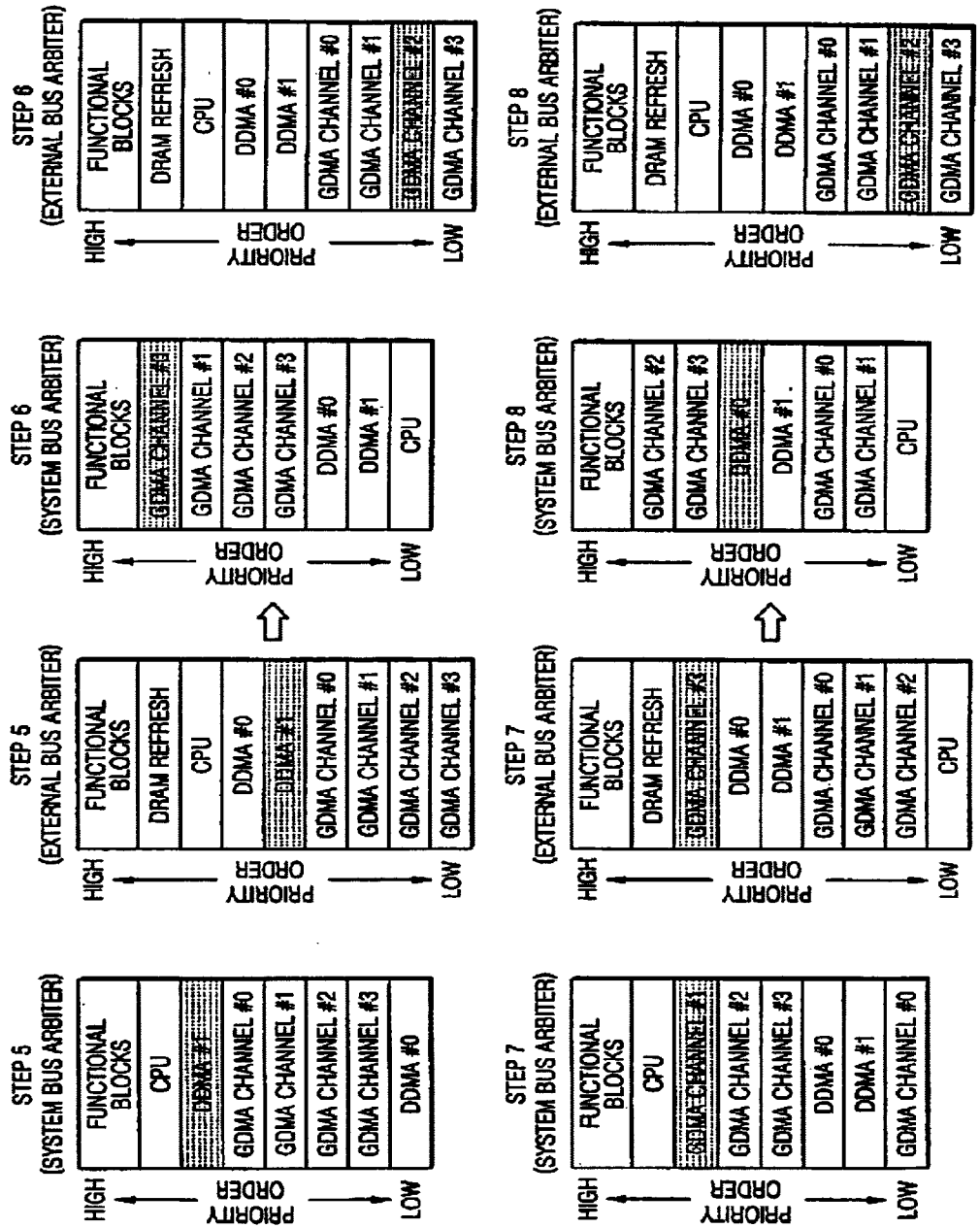

For Table 3, bus utilization is defined as the utilization rate of each bus during actual operation of each functional block having bus ownership. The case in which the functional block having system bus ownership cannot perform its operation due to the absence of external bus ownership (as shown in FIG. 3D) is excluded from the bus utilization of the conventional hierarchical bus arbitration scheme in Table 3.

As is evident from Table 3, according to the exclusive bus arbitration scheme, the probability of performing operation by all elements is the same. However, according to the conventional hierarchical bus arbitration scheme and the present invention, each set has a different value in the probability thereof. In the conventional exclusive bus arbitration scheme, the probability that the elements of sets EO, ES, and SO having bus ownership will perform their operations may be obtained from Equations (1), (2), and (3):

$$\frac{n(EO)}{n(A)} \times \frac{1}{n(EO)} = \frac{1}{n(A)} \quad (1)$$

$$\frac{n(ES)}{n(A)} \times \frac{1}{n(ES)} = \frac{1}{n(A)} \quad (2)$$

$$\frac{n(SO)}{n(A)} \times \frac{1}{n(SO)} = \frac{1}{n(A)} \quad (3)$$

Furthermore, the bus utilization when performing an operation by the elements of set EO, ES and SO according to the conventional exclusive bus arbitration scheme may be obtained from Equation (4):

$$\left(\frac{1}{n(A)} \times n(EO) \times \frac{1}{2}\right) + \left(\frac{1}{n(A)} \times n(ES) \times 1\right) + \left(\frac{1}{n(A)} \times n(SO) \times \frac{1}{2}\right) = \frac{n(EO) + 2n(ES) + n(SO)}{2n(A)} \quad (4)$$

In the conventional hierarchical bus arbitration scheme, the probability that the elements of sets EO, ES, and SO having bus ownership will perform their operations may be obtained from Equations (5), (6), and (7):

$$\left(\frac{n(SO)}{n(S)} \times \frac{1}{n(EO)}\right) + \left(\frac{n(ES)}{n(S)} \times \frac{1}{n(EO)} \times \frac{1}{2}\right) = \frac{n(ES) + 2n(SO)}{2n(S)n(EO)} \quad (5)$$

$$\frac{n(ES)}{n(S)} \times \frac{1}{n(ES)} \times \frac{1}{2} = \frac{1}{2n(S)} \quad (6)$$

$$\frac{n(SO)}{n(S)} \times \frac{1}{n(SO)} = \frac{1}{n(S)} \quad (7)$$

Furthermore, the bus utilization according to the conventional hierarchical bus arbitration scheme may be obtained from Equation (8):

$$\left(\frac{n(ES) + 2n(SO)}{2n(S)n(EO)} \times n(EO) \times \frac{1}{2}\right) + \left(\frac{1}{2n(S)} \times n(ES) \times 1\right) + \left(\frac{1}{n(S)} \times n(SO) \times \frac{1}{2}\right) = \frac{4n(SO) + 3n(ES)}{4n(S)} \quad (8)$$

In the present invention, the probability that the elements of sets EO, ES, and SO having bus ownership will perform their operations may be obtained from Equations (9), (10), and (11):

$$\left(\frac{n(EO)}{n(A)} \times \frac{1}{n(EO)}\right) + \left(\frac{n(SO)}{n(A)} \times \frac{1}{n(EO)}\right) = \frac{n(EO) + n(SO)}{n(A)n(EO)} \quad (9)$$

$$\frac{n(ES)}{n(A)} \times \frac{1}{n(ES)} = \frac{1}{n(A)} \quad (10)$$

$$\left(\frac{n(SO)}{n(A)} \times \frac{1}{n(SO)}\right) + \left(\frac{n(EO)}{n(A)} \times \frac{1}{n(SO)}\right) = \frac{n(SO) + n(EO)}{n(A)n(SO)} \quad (11)$$

Furthermore, the bus utilization according to the present invention may be obtained from Equation (12):

$$\left(\frac{n(E) + n(SO)}{n(A)n(EO)} \times n(EO) \times \frac{1}{2}\right) + \left(\frac{1}{n(A)} \times n(ES) \times 1\right) + \left(\frac{n(SO) + n(EO)}{n(A)n(SO)} \times n(SO) \times \frac{1}{2}\right) = 1 \quad (12)$$

As described above, the conventional hierarchical arbitration scheme and the bus arbitration scheme according to the present invention offer high probability that each functional block having bus ownership can perform its operation compared to the conventional exclusive bus arbitration scheme.

Furthermore, the bus arbitration scheme according to the present invention, the conventional hierarchical bus arbitration scheme, and the conventional exclusive bus arbitration scheme are in order of the size for a bus utilization (Equation (12)> Equation(8)> Equation(4)). Accordingly, the bus arbitration scheme according to the present invention allows for the programming of the priority of all functional blocks and a resulting high bus utilization.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and sub-combinations of features, functions, elements and/or properties may be presented in this or a related document.

What is claimed is:

1. A semiconductor device comprising:
    a chip;
    a plurality of first blocks on the chip;
    a system bus on the chip coupled with the first blocks;
    an external bus for coupling one of the first blocks to a plurality of second blocks external to the chip; and
    a single on-chip multi-jurisdictional arbiter adapted to receive requests for ownership of the system bus and of the external bus, to rank all the received requests according to a programmable priority schedule, to transmit a first grant signal to the one of the first blocks coupled to the external bus regarding a first ownership of the external bus, and to transmit a second grant signal regarding a second ownership of the system bus to another one of the first blocks that is concurrent with the first ownership.

2. The device of claim 1, wherein the arbiter includes
    a request decoder adapted to receive a request signal from the first block coupled to the external bus operating as a master of the external bus and another request signal from another one of the first blocks operating as a master of the system bus;
    a priority scheduler to receive an output of the request decoder;

a system bus master selector to receive an output of the priority scheduler containing data about a first top priority and further adapted to transmit the first grant signal responsive to the first top priority; and an external bus master selector to receive an output of the priority scheduler containing data about a second top priority and further adapted to transmit the second grant signal responsive to the second top priority.

3. The device of claim 1, further comprising:

a bridge on the chip;

an auxiliary system bus on the chip coupled to the system bus through the bridge; and a plurality of third blocks on the chip coupled with the auxiliary system bus, wherein the arbiter is adapted to transmit a third grant signal to one of the third blocks regarding a third ownership of the auxiliary system bus that is to be concurrent with the first ownership.

4. The device of claim 1, wherein the system bus is split into a left portion and a right portion separated by a bus switch, and the arbiter is adapted to transmit a control signal to the bus switch.

5. A device comprising:

a semiconductor chip;

a system bus on the chip;

an external bus;

a path distinct from the system bus and the external bus; and a plurality of first blocks an the chip coupled directly with the system bus, wherein at least one of the first blocks is an external memory controller coupled to the external bus and adapted to control at least one memory device that is external to the chip;

another one of the first blocks is a multi-jurisdictional multi-channel general direct memory access block capable of accessing each memory device via the external memory controller and the path, where the path couples the multi-jurisdictional multi-channel general direct memory access block and the external memory controller; and an on-chip multi-jurisdictional arbiter to transmit a first grant signal to one of the first blocks regarding a first ownership of the system bus and to transmit a second grant signal to the external memory device regarding a second ownership of the external bus that is concurrent with the first ownership.

6. The device of claim 5, wherein the arbiter includes:

a request decoder to receive a request signal from one of the external memory device and one of the first blocks;

a priority scheduler to receive an output of the request decoder;

a system bus master selector to receive a first output of the priority scheduler containing data about a first top priority and further adapted to transmit the first grant signal responsive to the first top priority; and an external bus master selector to receive a second output of the priority scheduler containing data about a second top priority and further adapted to transmit the second grant signal responsive to the second top priority.

7. The device of claim 6, wherein the arbiter further includes a system bus slave selector to transmit a select signal to one of the first blocks responsive to a third output originating from the priority scheduler.

8. The device of claim 7, wherein the third output is first received and decoded by the request decoder, and the system bus slave selector is adapted to receive from the system bus master selector a corresponding signal responsive to the third output.

9. The device of claim 5, wherein the external memory controller includes:

an external bus controller to control the external bus;

an address and control multiplexer adapted to receive address and control inputs from both the system bus and the multi-jurisdictional multi-channel general direct memory access block according to the first ownership, and adapted to transfer one of the received address and control inputs to the external bus controller according to the second ownership;

a write data multiplexer adapted to receive data inputs from both the system bus and the multi-jurisdictional multi-channel general direct memory access block, and adapted to transfer one of the received data inputs to the external bus controller; and a read data demultiplexer adapted to receive data inputs from the external bus controller, and adapted to transfer the received data inputs to one of the system bus and the multi-jurisdictional multi-channel general direct memory access block.

10. The device of claim 9, wherein the address and control multiplexer, the write data multiplexer, and the read data demultiplexer are controlled by inputs from the external bus controller.

11. The device of claim 9, further comprising:

at least one buffer coupled between the external bus controller and the external bus.

12. The device of claim 9, wherein the external bus controller is adapted to receive an external bus grant signal from the arbiter for controlling the external bus as a master.

13. The device of claim 9, wherein the external bus controller is adapted to receive a select signal from the arbiter for being controlled as a slave.

14. An article comprising: a storage medium, said storage medium having stored thereon instructions, that, when executed by at least one device, result in:

receiving a plurality of requests;

characterizing the received requests in terms of whether they would use one of a system bus of an on-chip system, an external bus of the system, or both the system bus and the external bus;

assigning priorities to the requests according to preset rankings;

selecting a first one of the requests having a top one of the priorities;

determining whether at least one of the system bus and the external bus would be idle if the first request were granted; and if so, selecting a second one of the requests that can be performed by at least one of the would-be idle buses, and then granting concurrently the first request and the second request.

15. The article of claim 14, wherein the instructions further result in:

determining whether a request having a second one of the priorities can be the second request.

16. The article of claim 14, wherein the instructions further result in:

if the request having the second one of the priorities can not be the second request, determining whether a request having a third one of the priorities can be the second request.

17. A method for a semiconductor chip having a plurality of on-chip functional blocks, at least one on-chip system bus for connecting at least some of the blocks, and an external bus for at least one of the functional blocks to exchange data with off-chip devices, the method comprising:

receiving a plurality of requests;

characterizing the received requests in terms of whether they would use one of the system bus, the external bus, or both the system bus and the external bus;

selecting a first one of the requests;

identifying the system bus or the external bus that would be idle if the first request were performed;

selecting a second one of the requests that can be performed by at least one of the system bus and the external bus that would be idle if the first request were performed; and granting the second request concurrently with granting the first request.

18. The method of claim 17, further comprising:

assigning respective non-hierarchical priorities to all the requests by a single on-chip multi-jurisdictional arbiter, wherein the first request is the one with a top one of the priorities.

19. The method of claim 17, further comprising:

identifying all buses on the chip that would be idle if the first request and the second request were performed concurrently;

selecting a third one of the requests that can be performed by an auxiliary system bus on the chip which would be idle if the first request and the second request were performed concurrently; and granting the third request concurrently with granting the first request.

20. The method of claim 17, further comprising:

transferring a first set of data through the system bus pursuant to the granted first request;

transferring a second set of data through the external bus pursuant to the granted second request concurrently with transferring the first set of data; and transferring a third set of data through an auxiliary system bus pursuant to the granted third request concurrently with transferring the first set of data.

21. The method of claim 17, further comprising:

transferring a single set of data through an auxiliary system bus, the system bus, and the external bus pursuant to the granted first, second and third requests.

22. A method for a semiconductor chip having an on-chip CPU block, an on-chip functional block, at least one on-chip system bus for connecting the CPU block and the functional block, an on-chip DRAM refresh controller and an external bus, the method comprising:

receiving a plurality of requests, a first one of which being from the DRAM refresh controller for using only the external bus;

examining whether a second one of the remaining requests is for using only the system bus; and if so, granting the first and second requests to be performed concurrently.

23. The method of claim 22, further comprising:

assigning priorities to the requests;

selecting a request having a second one of the priorities; and determining whether the selected request can be the second request.

24. The method of claim 22, farther comprising:

if the request having the second one of the priorities can not be the second request, determining whether a request having a third one of the priorities can be the second request.

25. A method for a semiconductor chip having a plurality of on-chip functional blocks, at least one on-chip system bus for connecting at least some of the blocks, and an external bus for at least one of the functional blocks to exchange data with off-chip devices, the method comprising:

receiving a plurality of requests;

characterizing the received requests in terms of whether they would use one of the system bus, the external bus, or both the system bus and the external bus;

assigning priorities to the requests according to preset rankings;

selecting a first one of the requests having a top one of the priorities;

determining whether at least one of the system bus and the external bus would be idle if the first request were granted; and if so, selecting a second one of the requests that can be performed by at least one of the would-be idle buses, and then granting concurrently the first request and the second request.

26. The method of claim 25, further comprising:

determining whether a request having a second one of the priorities can be the second request.

27. The method of claim 26, further comprising:

if the request having the second one of the priorities can not be the second request, determining whether a request having a third one of the priorities can be the second request.

28. A device comprising:

a semiconductor chip;

a system bus on the chip;

an external bus;

a path distinct from the system bus and the external bus; and a plurality of first blocks on the chip coupled directly with the system bus, wherein at least one of the first blocks is an external memory controller coupled to the external bus and adapted to control at least one memory device that is external to the chip, and another one of the first blocks is a multi-jurisdictional multi-channel general direct memory access block that is coupled with the external memory controller via the path; and an on-chip multi-jurisdictional arbiter to transmit a first grant signal to one of the first blocks regarding a first ownership of the system bus and to transmit a second grant signal to the external memory device regarding a second ownership of the external bus that is concurrent with the first ownership.

29. The device of claim 28, wherein the arbiter includes:

a request decoder to receive a request signal from one of the external memory device and one of the first blocks;

a priority scheduler to receive an output of the request decoder;

a system bus master selector to receive a first output of the priority scheduler containing data about a first top priority and further adapted to transmit the first grant signal responsive to the first top priority; and an external bus master selector to receive a second output of the priority scheduler containing data about a second top priority and further adapted to transmit the second grant signal responsive to the second top priority.

30. The device of claim 29, wherein the arbiter further includes a system bus slave selector to transmit a select signal to one of the first blocks responsive to a third output originating from the priority scheduler.

31. The device of claim 30, wherein the third output is first received and decoded by the request decoder, and the system bus slave selector is adapted to receive from the system bus master selector a corresponding signal responsive to the third output.

32. The device of claim 28, wherein the external memory controller includes:

an external bus controller to control the external bus;

an address and control multiplexer adapted to receive address and control inputs from both the system bus and the multi-jurisdictional multi-channel general direct memory access block according to the first ownership, and adapted to transfer one of the received address and control inputs to the external bus controller according to the second ownership;

a write data multiplexer adapted to receive data inputs from both the system bus and the multi-jurisdictional multi-channel general direct memory access block, and adapted to transfer one of the received data inputs to the external bus controller; and a read data demultiplexer adapted to receive data inputs from the external bus controller, and adapted to transfer the received data inputs to one of the system bus and the multi-jurisdictional multi-channel general direct memory access block.

33. The device of claim 32, wherein the address and control multiplexer, the write data multiplexer, and the read data demultiplexer are controlled by inputs from the external bus controller.

34. The device of claim 32, further comprising:

at least one buffer coupled between the external bus controller and the external bus.

35. The device of claim 32, wherein the external bus controller is adapted to receive an external bus grant signal from the arbiter for controlling the external bus as a master.

36. The device of claim 32, wherein the external bus controller is adapted to receive a select signal from the arbiter for being controlled as a slave.

37. An article comprising: a storage medium, said storage medium having stored thereon instructions, that, when executed by at least one device, result in:

granting a request by an on-chip multi-jurisdictional multi-channel general direct memory access (mJmCGDMA) block to control only a system bus in an on-chip system;

then granting a request by the mJmCGDMA block to control only an external bus in an off-chip system; and then granting a request by the mJmCGDMA block to control both the system bus and the external bus concurrently.

38. A method for a semiconductor chip having an on-chip multi-jurisdictional multi-channel general direct memory access (mJmCGDMA) block, an on-chip functional block, at least one on-chip system bus for connecting the on-chip blocks, and an external bus for the mJmCGDMA block to exchange data with an off-chip device, the method comprising:

granting a request by the mJmCGDMA block to control only the system bus in a first cycle;

then granting a request by the mJmCGDMA block to control only the external bus in a second cycle subsequent to the first cycle; and then granting a request by the mJmCGDMA block to control the system bus and the external bus concurrently in a third cycle subsequent to the second cycle.

* * * * *

UNITED STATES PATENT AND TRADEMARK OFFICE
CERTIFICATE OF CORRECTION

PATENT NO. : 6,976,108 B2
APPLICATION NO. : 09/773874
DATED : December 13, 2005
INVENTOR(S) : Kim et al.

It is certified that error appears in the above-identified patent and that said Letters Patent is hereby corrected as shown below:

At column 4, line 46, please replace "396," with --396.--

At column 11, line 16, please replace "GDMA." with --GDMA--

At column 11, line 56, please replace "2'b01" with --2'b11--

At column 12, line 25, please replace "n(ES)=n(E∩S)=n(E∩S)=n(S∩S)." with --n(ES)=n(E∩S)=n(E∩ES)=n(S∩ES).--

At column 21, line 31, please replace "an the chip" with --on the chip--

At column 24, line 8, please replace "farther" with --further--

Signed and Sealed this

Ninth Day of January, 2007

JON W. DUDAS
*Director of the United States Patent and Trademark Office*